(12) United States Patent
Okuno

(10) Patent No.: US 6,249,649 B1
(45) Date of Patent: Jun. 19, 2001

(54) APPARATUS HAVING A FILM-CARTRIDGE-ID CONFIRMING FUNCTION

(75) Inventor: Ryoji Okuno, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/208,763

(22) Filed: Dec. 10, 1998

(30) Foreign Application Priority Data

Dec. 16, 1997 (JP) ...................................................... 9-363326

(51) Int. Cl.$^7$ ............................... G03B 7/24; G03B 17/24
(52) U.S. Cl. ......................... 396/207; 396/297; 396/300; 396/310
(58) Field of Search .................................... 396/310–321, 396/429, 207–211, 297, 300

(56) References Cited

U.S. PATENT DOCUMENTS 5,930,537 * 7/1999 Okuno et al. ......................... 396/281
5,966,553 * 10/1999 Nishitani et al. ..................... 396/311

FOREIGN PATENT DOCUMENTS 5-45755   2/1993 (JP).
7-219201  8/1995 (JP).

* cited by examiner

Primary Examiner—David M. Gray
(74) Attorney, Agent, or Firm—Fitzpatrick, Cella, Harper & Scinto

(57) ABSTRACT

An apparatus having a film-cartridge-ID confirming funtion which is adapted to a film cartridge with an information recording portion includes a reading device that reads ID information for identifying the film cartridge from the information recording portion, an input device that inputs information from the outside, and an operation control device that performs an operation corresponding to whether or not the ID information read by the reading device and the information input to the input device is in a predetermined relationship.

22 Claims, 18 Drawing Sheets

FIG.2(a)
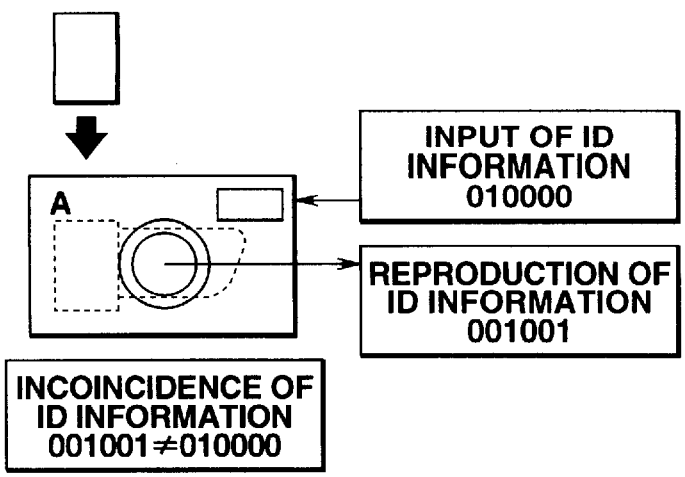
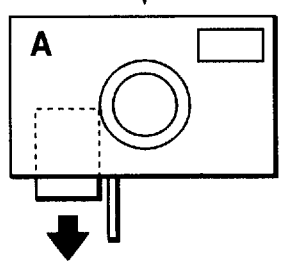
FIG.2(b)
FIG.2(c)
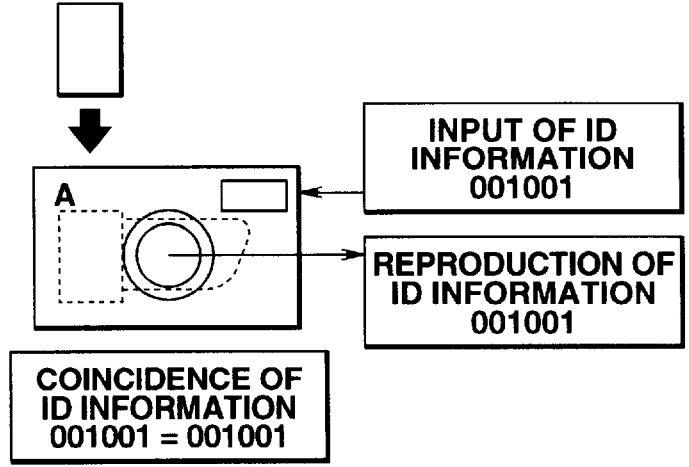
FIG.2(d)
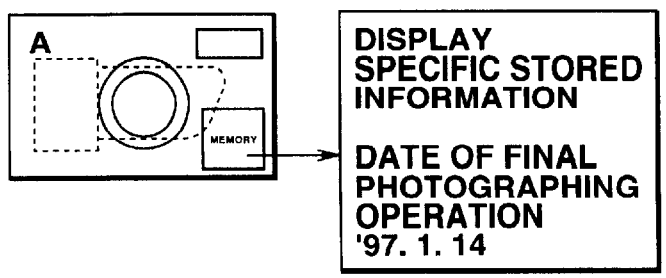

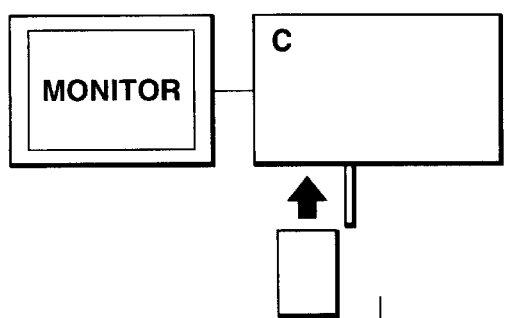
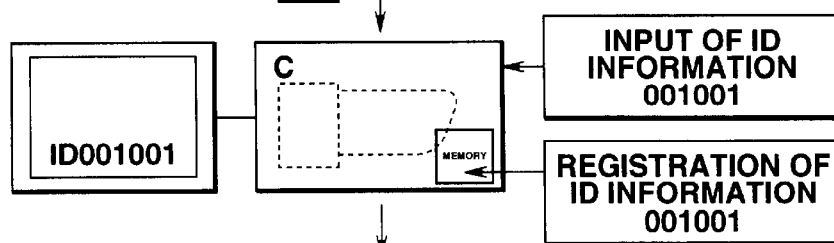
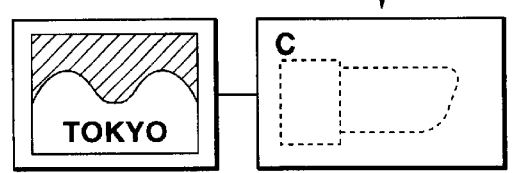
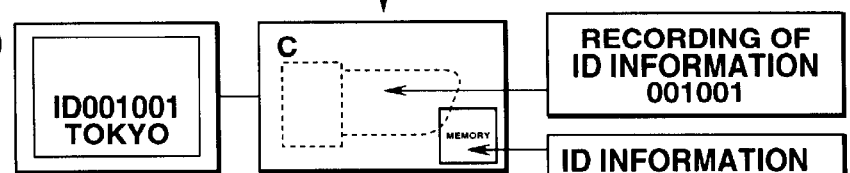
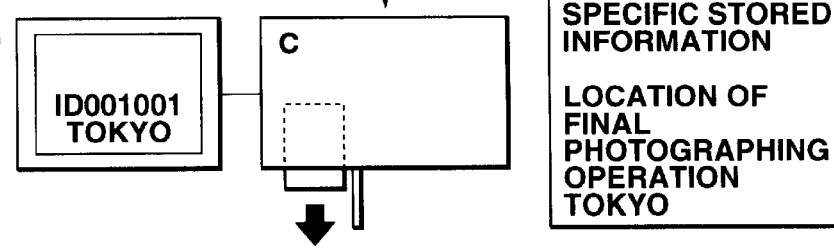

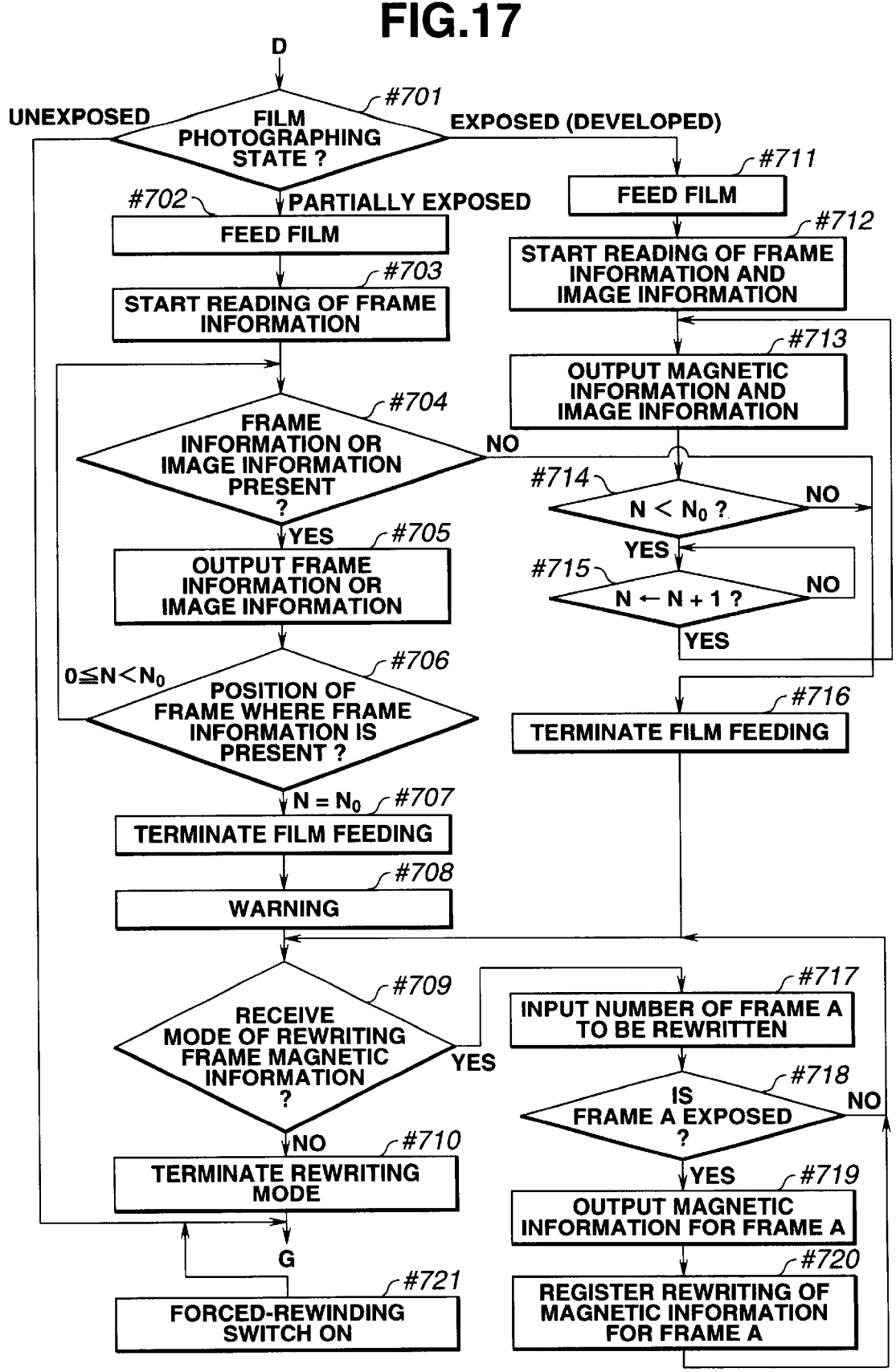

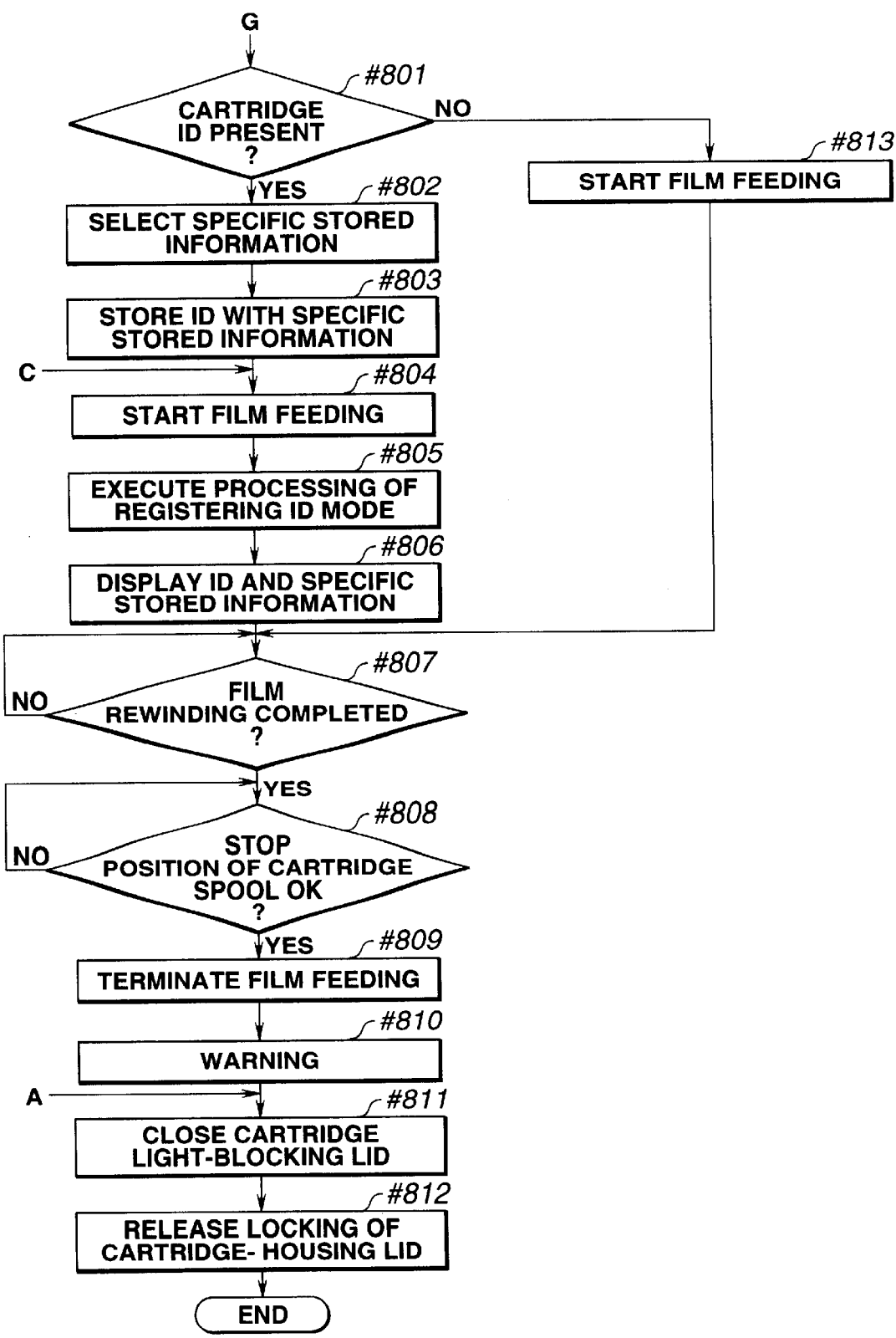

APPARATUS HAVING A FILM-CARTRIDGE-ID CONFIRMING FUNCTION

BACKGROUND OF THE INVENTION

1. Field of the Invention

The present invention relates to an apparatus, such as a camera or the like, capable of confirming ID (identification) information of a film cartridge.

2. Description of the Related Art

Recently, attempts to provide a magnetic layer on a photographing film or on the outside of a film cartridge containing a rolled photographing film have been proposed (for example, Japanese Patent Laid-Open Application (Kokai) No. 5-45755 (1993)). Most of commercially available products using a standard film 24 mm wide for realizing such attempts are accommodated in respective film cartridges in a state in which the film cannot be seen from the outside whether the film is undeveloped or developed. Hence, it is impossible to know the contents of an exposed film accommodated in a film cartridge.

In film cartridges accommodating respective commercially available standard films 24 mm wide, in order to individually identify a film cartridge and a film, a bar code representing an ID number is exposed on the film during the production of the film so that ID information appears on the film after being developed, or the ID number is marked in the form of a bar code or a numeral on the outside of the film cartridge.

However, in order to cause an apparatus to recognize the ID information marked on the outside of the film cartridge, it is necessary to read the ID information using an ID reading apparatus, or the user must input the ID information to the apparatus while reading the ID information.

A proposal for performing a series of reading operations corresponding to the ID information has been provided in Japanese Patent Laid-Open Application (Kokai) No. 7-219201 (1995). However, as described in embodiments disclosed in this application, the ID bar code on the film can be dealt with only in the case of a developed film. In order to read the ID bar code or the ID number marked on the outside of the film cartridge, it is necessary to provide a dedicated ID reading device in the camera or the apparatus which uses the film cartridge, or the user himself must read the ID information marked on the outside of the film cartridge and input the read ID information using an input apparatus. Such an apparatus will be complicated, expensive and large, and will require a troublesome operation. In addition, the user cannot provide a classified ID number. Since the ID number can be seen on the outside of the film cartridge, anybody can use the film cartridge and read specific stored information.

As described above, identification of a film using ID information allocated during the production of the film has many problems, and it can be said that such ID information cannot be used as a personal identification number.

SUMMARY OF THE INVENTION

It is an object of the present invention to solve the above-described problems.

According to one aspect, the present invention relates to an apparatus having a film-cartridge-ID confirming function which can effectively deal with ID information of a film cartridge with an information recording portion. The apparatus includes a reading device that reads ID information for identifying the film cartridge from the information recording portion, an input device that inputs information from the outside, and an operation control device that performs an operation corresponding to whether or not the ID information read by the reading device and the information input from the input device is in a predetermined relationship.

The foregoing and other objects, advantages and features of the present invention will become more apparent from the following detailed description of the preferred embodiments taken in conjunction with the accompanying drawings.

BRIEF DESCRIPTION OF THE DRAWINGS

FIGS. 1(a)–(e), 2(a)–(d) and 3(a)–(d) are schematic diagrams, each illustrating the concept when an apparatus having a cartridge-ID recognizing function is applied to a camer aaccording to a first embodiment of the present invention;

FIGS. 11(a)–(e), 12(a)–(d) and 13(a)–(d) are schematic diagrams, each illustrating the concept when an apparatus having a cartridge-ID recognizing function is applied to a film scanner according to a second embodiment of the present invention;

FIGS. 16 through 18 are flowcharts illustrating the operation of the film scanner according to the second embodiment.

DETAILED DESCRIPTION OF THE PREFERRED EMBODIMENTS

Preferred embodiments of the present invention will now be described in detail with reference to the drawings.

FIGS. 1–3 are schematic diagrams illustrating the concept of a first embodiment of the present invention.

Figure 1A:
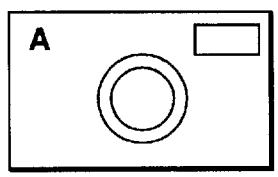
Figure 1B:
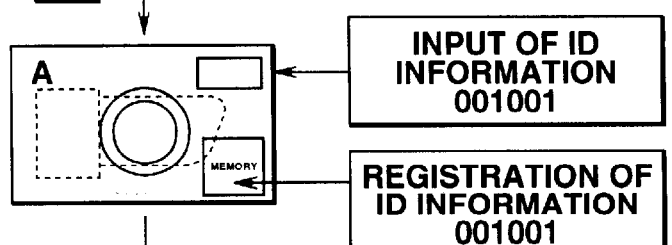
Figure 1C:
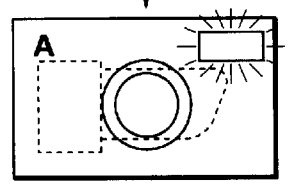

FIG. 1(a) illustrates a state in which an unused film cartridge (hereinafter abbreviated as a "cartridge") is loaded in a camera A. FIG. 1(b) illustrates a state in which the user of the camera A inputs arbitrary film-ID information (represented by 001001) in the camera A, and registers the ID information in a nonvolatile storage unit provided within the camera A in order to write the ID information in the loaded cartridge. FIG. 1(c) illustrates a state in which the user performs a photographing operation using the camera A. The user performs magnetic recording of information relating to each exposed frame (the state of exposition, the date of the photographing operation, and the like) on the film accommodated in the cartridge.

Figure 1D:
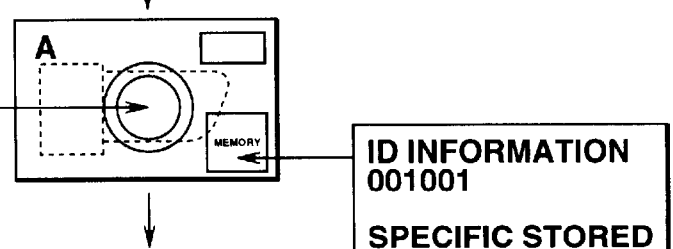

FIG. 1(d) illustrates a state in which the film having unexposed frames is rewound. Film-ID information arbitrarily set by the user (represented by 001001) is recorded at a predetermined position of a magnetic recording portion provided on the film. In addition, the date of exposing the final frame ('97.1.14 shown in FIG. 1(d)), serving as specific stored information related to the film-ID information, is stored in the nonvolatile storage unit provided in the main body of the camera A.

ID information is determined by the user's free will. ID information may differ at every photographing operation, or the same ID information determined by the user may be registered at every photographing operation. In the latter case, however, it is recommended not to store specific stored information related to the ID information, because the specific stored information cannot be correctly utilized in such a case. The date of the latest photographing operation is stored in the nonvolatile storage unit as specific stored information related to registered ID information when the film is rewound.

Figure 1E:
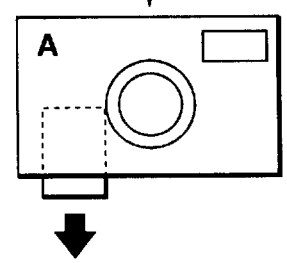
Figure 3A:
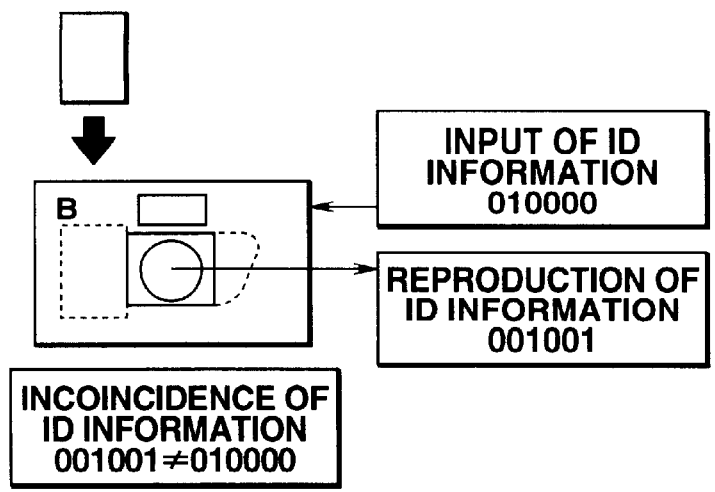
Figure 3B:
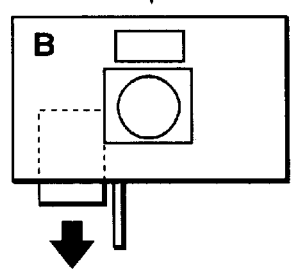
Figure 3C:
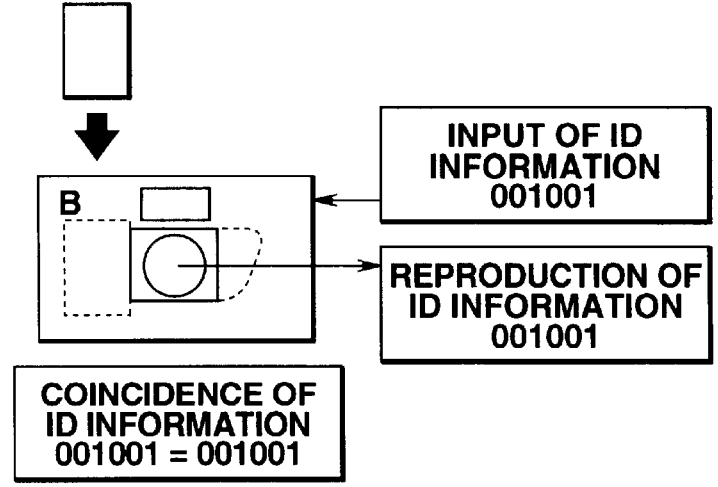
Figure 3D:
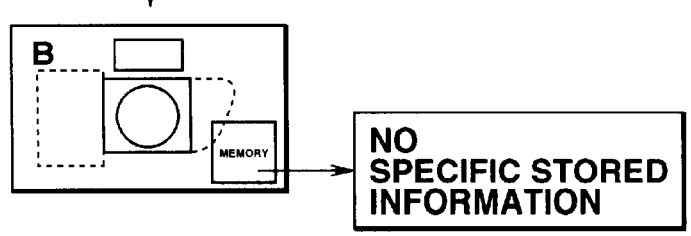

FIG. 1(e) illustrates a state in which the cartridge in which the ID information has been recorded on the film is discharged from the camera A.

FIG. 2 illustrates a state in which the cartridge, where the ID information has been recorded and that has been discharged in the state shown in FIG. 1(e), is again loaded in the camera A.

FIG. 2(1)(a) illustrates a state in which after loading the cartridge, the film-ID information (represented by 001001) is read and compared with ID input information set by the user (represented by 010000). In this case, the read ID information does not coincide with the ID input information for the camera A (represented by 001001≠010000). Hence, in FIG. 2(1)(b), the loaded cartridge is ejected so as not to be used.

FIG. 2(2)(c) illustrates a state in which after loading the cartridge, the film-ID information (represented by 001001) is read and compared with ID input information set by the user (represented by 001001). In this case, the read ID information coincides with the ID input information for the camera A (represented by 001001=001001). Hence, in FIG. 2(2)(d), the specific stored information related to the ID information stored in the nonvolatile storage unit of the camera A is read out and displayed on a display unit provided in the camera A (the date of the final photographing operation '97.1.14).

FIG. 3 is a diagram illustrating a state in which the cartridge, where the ID information has been recorded and that has been discharged in FIG. 1(d), is again loaded in a camera which uses another ID system.

FIG. 3(1)(a) illustrates a state in which after loading the cartridge, the film-ID information (represented by 001001) is read and compared with ID input information set by the user (represented by 010000). In this case, the read ID information does not coincide with the ID input information for the camera B (represented by 001001≠010000). Hence, in FIG. 3(1)(b), the loaded cartridge is ejected so as not to be used.

FIG. 3(2)(c) illustrates a state in which after loading the cartridge, the film-ID information (represented by 001001) is read and compared with ID input information set by the user (represented by 001001). In this case, the read ID information coincides with the ID input information for the camera B (represented by 001001=001001). Hence, in FIG. 3(2)(d), it is intended to detect specific stored information related to the ID information stored in a nonvolatile storage unit provided in the camera B. Since specific stored information is not stored in the camera B, display of specific stored information is not performed, although the cartridge can be used.

Figure 4:
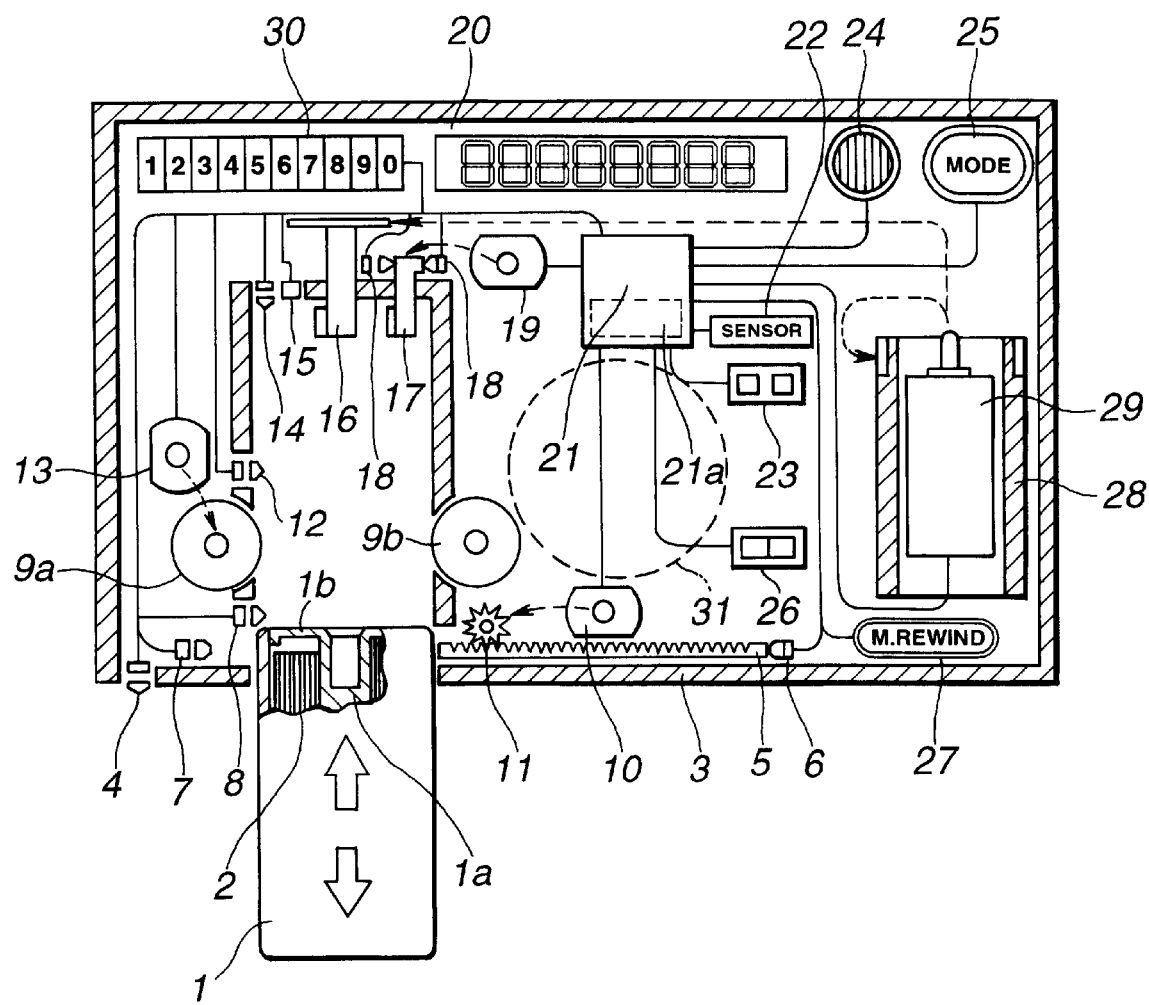
FIG. 4 is a cross-sectional view illustrating the schematic configuration of the camera according to the first embodiment.

FIG. 4 is a schematic cross-sectional view illustrating the configuration of a camera in which the concept shown in FIGS. 1–3 is realized.

In FIG. 4, in a cartridge 1, a photographing film 2 having a magnetic layer thereon is wound around a shaft 1a. A flange portion 1b on which cartridge information (information indicating the characteristics of the film, such as the number of photographable frames, the ISO (International Organization for Standardization) sensitivity, negative/positive, and the like) is indicated by a bar code is provided at an end portion of the shaft 1a. Reference numeral 3 represents a camera. There are also shown a catridge-housing-lid opening switch 4, a cartridge-housing lid 5, a catridge-housing-lid opening completion detection switch 6, and a cartridge-housing-lid closing detection switch 7. A motor 10 for driving opening/closing of the cartridge-housing lid 5 is controlled by a control device 21. The power of the motor 10 is transmitted to a cartridge-housing-lid driving gear 11 via a gear train (not shown). Reference numeral 8 represents a cartridge drawing start switch. A motor 13 draws/feeds the cartridge 1. The power of the motor 13 is transmitted to a cartridge conveyance driving roller 9a via a gear train (not shown). Reference numeral 9b represents a cartridge conveyance driven roller. The cartridge 1 is drawn/fed by being grasped between these rollers 9a and 9b. A cartridge feeding detection switch 12 detects a timing of feeding the cartridge 1.

A cartridge loading completion detection switch 14 and a cartridge-information reading sensor 15 output the cartridge information read from the flange portion 1b to the control device 21. The power from a film feeding motor 29 is transmitted to a fork gear 16 which is engaged with the cartridge shaft 1a in order to feed the film 2 toward a spool 28. The film 2 fed from the cartridge 1 passes through the inside of the camera 3, and is wound around the spool 28 driven by the film feeding motor 29. A driver 17 drives a cartridge light-blocking lid for obturating the film entrance of the cartridge 1, in order to open/close the cartridge light-blocking lid by being driven by a motor 19 for driving the driver 17. A switch 18 detects the opened/closed position of the cartridge light-blocking lid.

A liquid-crystal display unit 20 is driven by the control device 21. Reference numeral 21a represents a nonvolatile storage unit. An information detection unit 22 obtains information useful for determining the state of a photographing operation, and comprises, for example, a thermometer, a position detection sensor utilizing a GPS (global positioning system) or the like, and a clock. A film-position detection sensor 23 detects the fed position of the film 2. A warning sound generator 24 generates a warning to the user when an abnormal camera operation is performed. A mode changing switch 25 selects specific stored information of the photographed film. A magnetic head 26 performs magnetic recording/reading on/from the magnetic layer of the film 2. Reference numeral 27 represents a forced rewinding switch. A key-input switch unit 30 is used for inputting ID information and the like to the camera 3. A photographing unit 31 includes a photographing lens-barrel, and devices (not shown), such as a lens-barrel driving unit, a shutter driving unit, an exposure switch and the like, which can expose the film 2.

Figure 5:
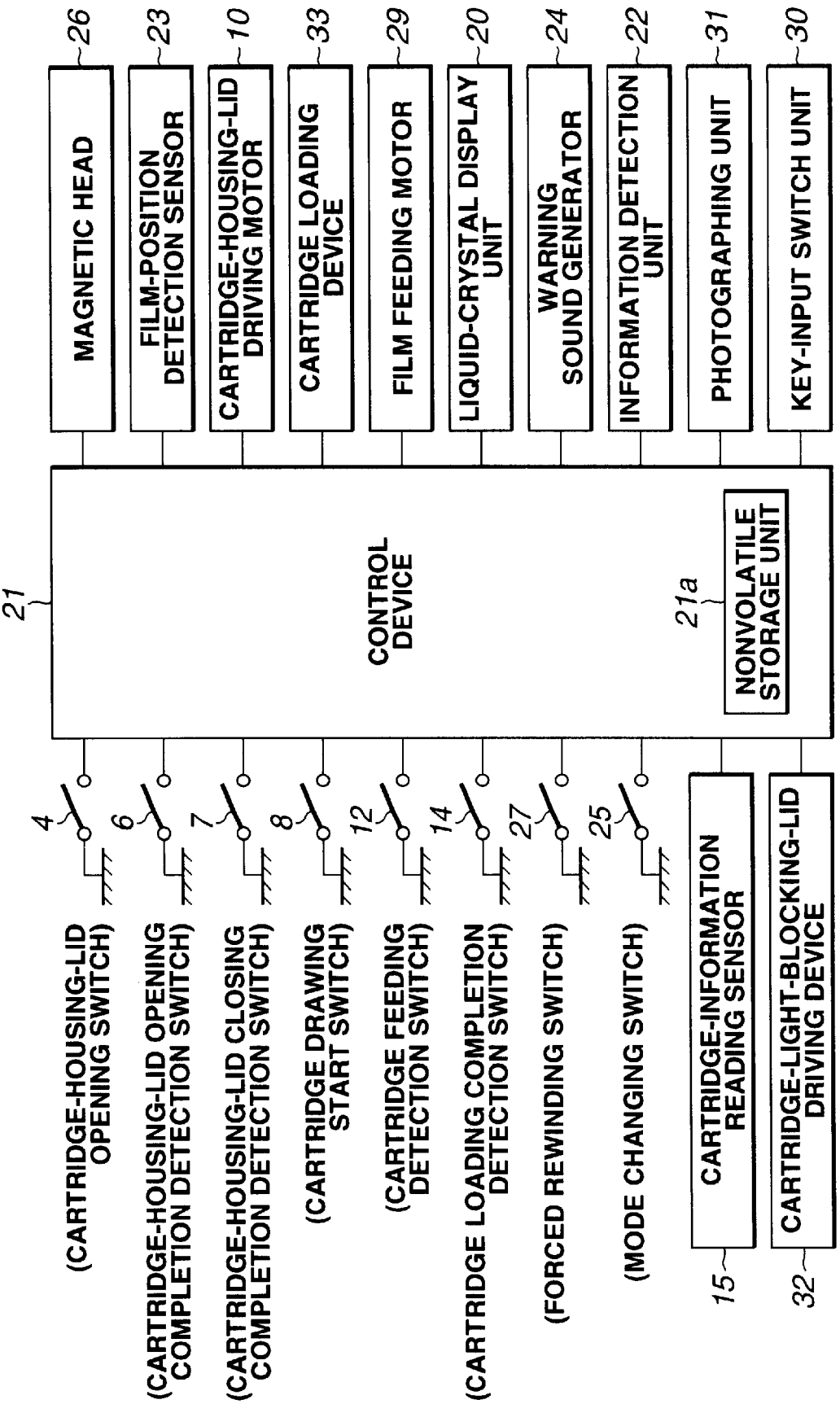
FIG. 5 is a block diagram illustrating the electric configuration of the camera according to the first embodiment.

FIG. 5 is a block diagram illustrating the electric configuration of the camera 3.

In FIG. 5, a cartridge-light-blocking-lid driving device includes the driver 17 for driving the cartridge light-blocking lid, the motor 19 for driving the driver 17, and the switch 18 for detecting the opened/closed position of the cartridge light-blocking lid. A cartridge loading device 33 includes the motor 13 for drawing/feeding the cartridge 1, the cartridge conveyance driving roller 9a, and the cartridge conveynance driven roller 9b.

Other components have been described with resepct to FIG. 4. As shown in FIG. 5, all the switches and devices are connected to the control device 21.

Figure 6:
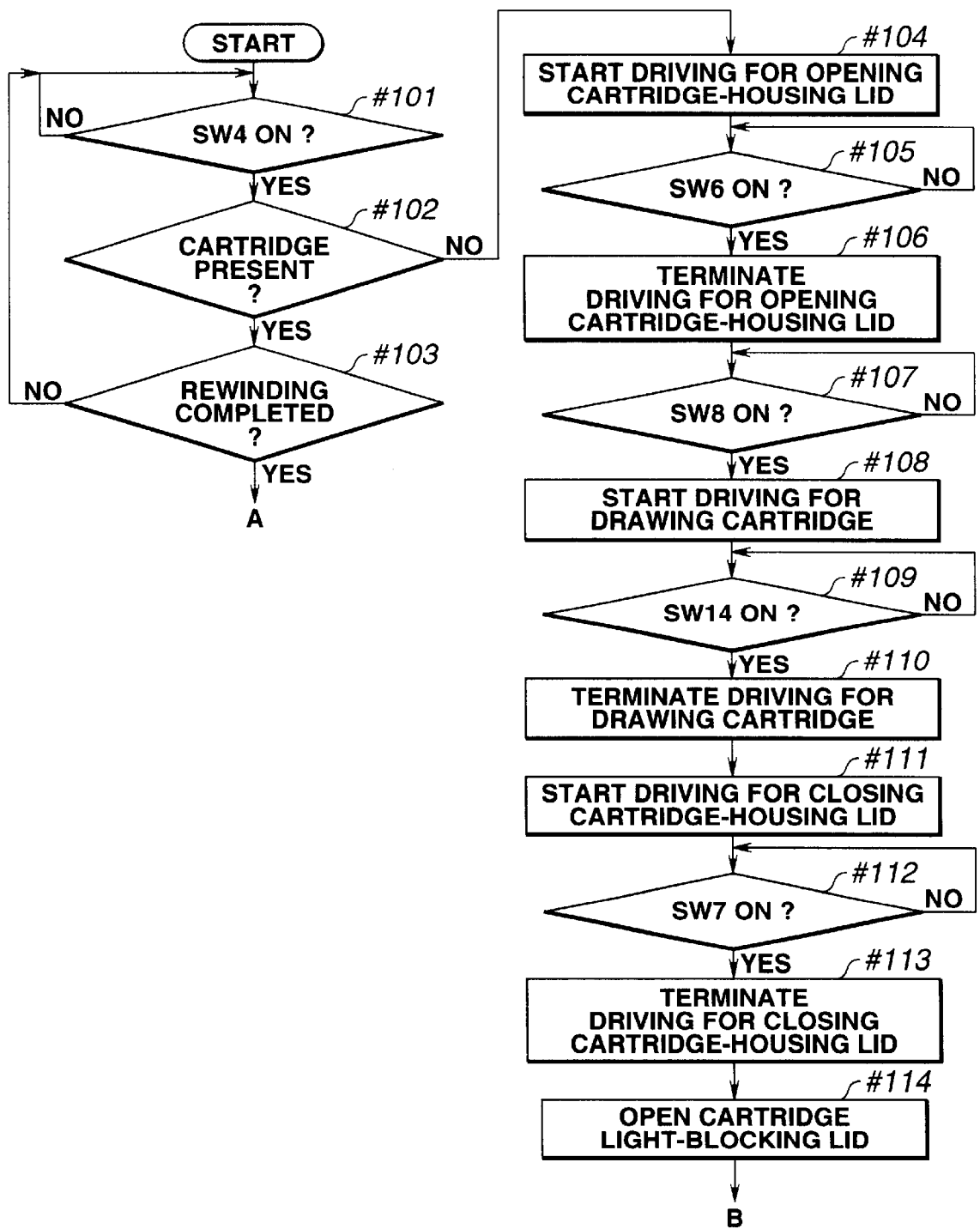
FIGS. 6 through 10 are flowcharts illustrating the operation of the camera according to the first embodiment.
Figure 7:
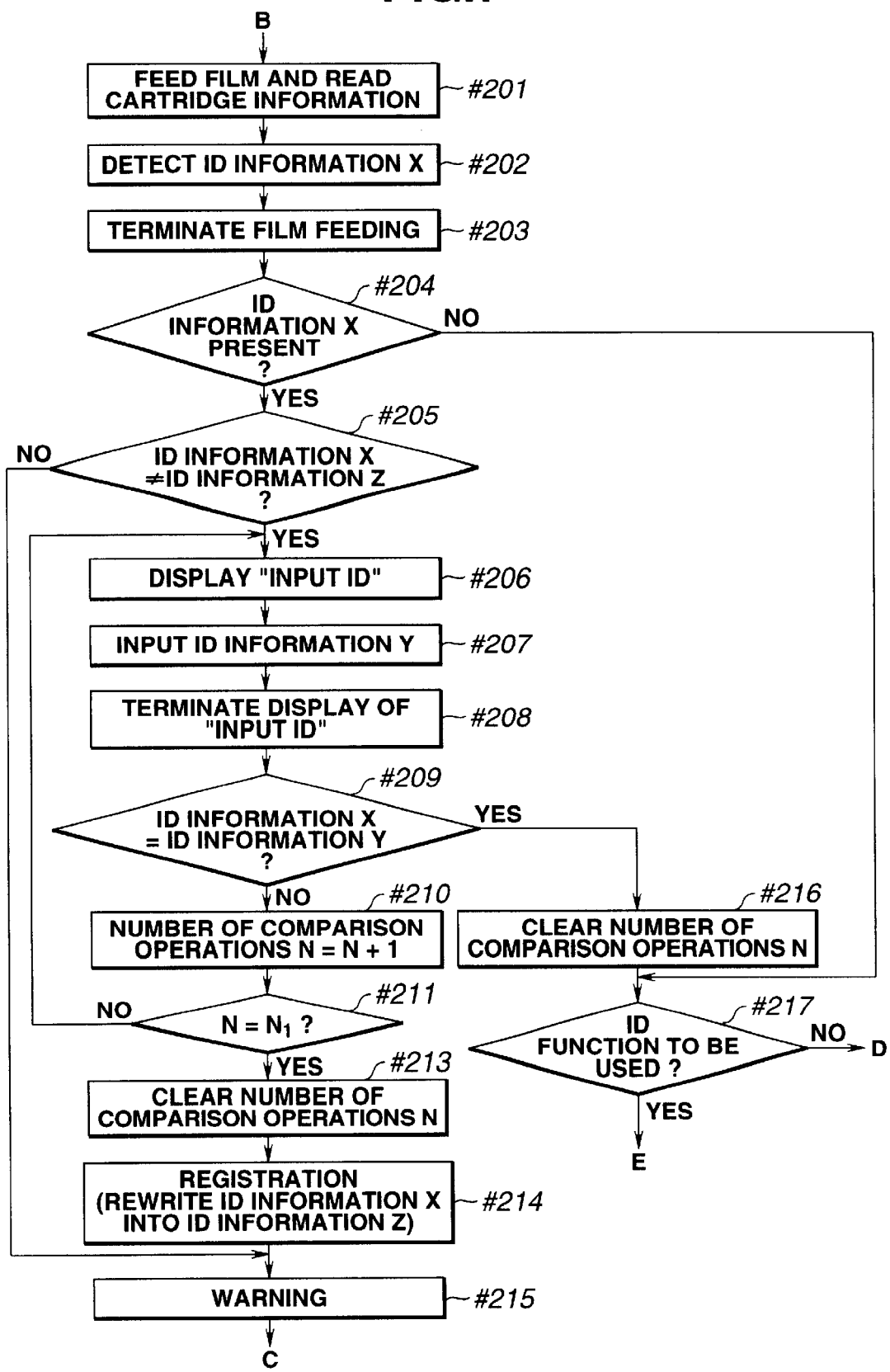
Figure 8:
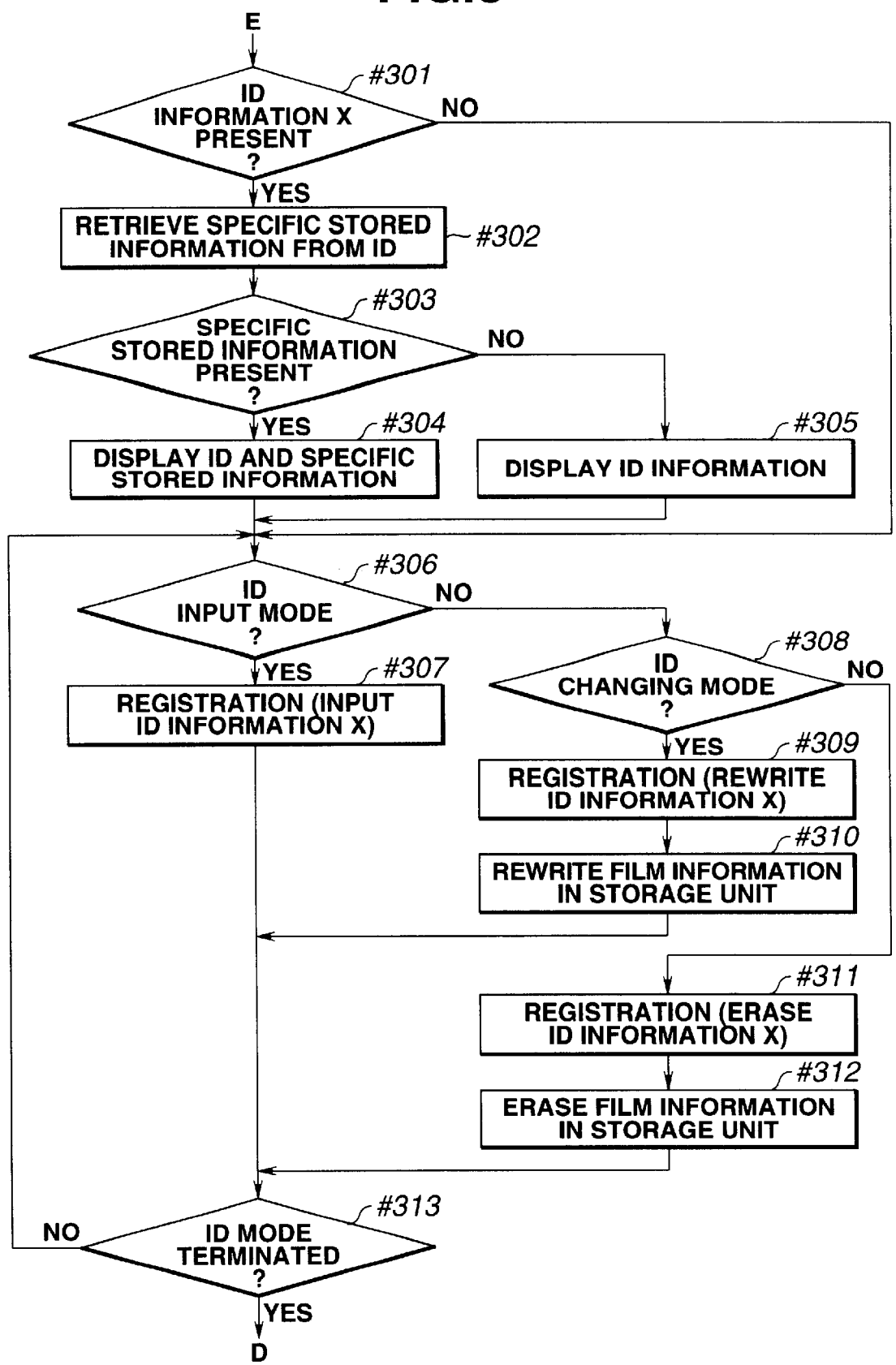

FIGS. 6–8 are flowcharts illustrating the operation of the control device 21 in the camera 3 having the above-described configuration. In the first embodiment, a camera using a film having a magnetic layer (magnetic recording portion) thereon is considered as a catridge-ID-information recognizing apparatus, and a case of adopting a microprocessor as the control device 21 will be illustrated.

In FIG. 6, first, in step #101, the control device 21 determines if the cartridge-housing-lid opening switch 4 (abbreviated as SW4 in the flowchart) is switched on by the user in order to load the cartridge 1 within the camera 3. If the result of the determination in step #101 is affirmative, the process proceeds to step #102, where it is determined if the cartridge 1 is loaded within the camera 3. If the result of the determination in step #102 is affirmative, the process proceeds to step #103, where it is determined if the film 2 is rewound. If the result of the determination in step #103 is negative, the process returns to step #101. If the result of the determination in step #103 is affirmative, the process proceeds to step #511 shown in FIG. 10.

If the result of the determination in step #102 is negative, the process proceeds to step #104, where driving to open the catridge-housing lid 5 is started by driving the motor 10 for driving the cartridge-housing lid 5. Then, in step #105, it is determined if the cartridge-housing lid 5 has been opened to a predetermined position, and the catridge-housing-lid opening completion detection switch 6 (abbreviated as SW6 in the flowchart) is thereby switched on. If the result of the determination in step #105 is negative, the process remains in this step until the SW6 is swithed on. If the result of the determination in step #105 is affirmative, the process proceeds to step #106, where the driving of the motor 10 is stopped, to stop the driving to open the cartridge-housing lid 5.

The cartridge-housing lid 5 is thus opened, and the user inserts the cartridge 1 into the camera 3. The cartridge drawing start switch 8 disposed near an insertion port provided in the cartridge housing is thereby switched on.

Then, in step #107, it is determined if the cartridge drawing start switch 8 (abbreviated as SW8 in the flowchart) is switched on. If the result of the determination in step #107 is affirmative, the process proceeds to step #108, where drawing of the cartridge 1 is started by driving the cartridge loading device 33. In more detail, driving for drawing the cartridge 1 to a predetermined position within the cartridge housing by the rollers 9a and 9b is started by driving the cartridge conveying motor 13. Then, in step #109, it is determined if the cartridge loading completion detection switch 14 (abbreviated as SW14 in the flowchart) is switched on by being depressed by the end portion of the drawn and loaded cartridge 1. If the result of the determination in step #109 is affirmative, the process proceeds to step #110, where the driving of the cartridge loading device 33 is stopped in order to terminate the driving to draw the cartridge 1.

Then, in step #111, the motor 11 is again driven in order to close the cartridge-housing lid 5. This driving is performed until it is determined in step #112 that the cartridge-housing-lid closing completion detection switch (abbreviated as SW7 in the flowchart) 7 is switched on. If the result of the determination in step #112 is affirmative, process proceeds to step #113, where the driving of the motor 10 is stopped in order to terminate the driving to close the cartridge-housing lid 5. Then, in step #114, in order to read the bar code, serving as the cartridge information, provided on the flange portion 1c by the cartridge-information reading sensor 15, the light-blocking lid provided at the film entrance port of the cartridge 1 is opened by rotating the driver 17 for driving the cartridge light-blocking lid by driving the motor 19 for driving the driver 17, and the process then proceeds to step #201 shown in FIG. 7.

In step #201 shown in FIG. 7, since the cartridge light-blocking lid has been opened, the film 2 is driven in a rewinding direction by rotating the fork gear 16 by driving the film feeding motor 29. Cartridge information is read during this driving. Then, the driving of the motor 29 is switched to a winding direction. Then, in step #202, ID information magnetically recorded on a predetermined position of a leader portion of the film 2 fed from the cartridge 1 (described as ID information X in the flowchart) is reproduced (detected) using the magnetic head 26. Then, in step #203, film feeding is stopped by stopping the driving of the motor 29.

Then, in step #204, it is determined if the ID information could be reproduced from the predetermined position on the film 2. If the result of the determination in step #204 is affirmative, the process proceeds to step #205, where it is determined if the reproduced ID information is different from ID information Z which has been set in advance to be unusable. If the result of the determination in step #205 is negative, i.e., the ID information X≠the ID information Z, the process proceeds to step #206, where a display "Input ID" is performed on the liquid-crystal display unit 20 in order to urge the user to input ID information. Instead of the display, the urging may be performed by a sound using the warning sound generator 24, serving as a warning unit, provided in the camera 3. Then, in step #207, the user who has seen the display inputs ID information by operating the key-input switch unit 30, and the ID information is input as ID information Y. Then, in step #208, the display "Input ID" on the liquid-crystal display unit 20 is stopped.

Then, in step #209, the control device 21 determines if the ID information X reproduced from the film 2 and the ID information Y input by the user are in a predetermined relationship. If the result of the determination in step #209 is negative, i.e., when the ID information X does not coincide with the ID information Y, the process proceeds to step #210, where the number of comparison operations N (counted at every input) is stored. Then, in step #211, it is determined if the number of comparison operations reaches the preset number $N_1$. If the result of the determination in step #211 is negative, the process returns to step #206, and input of ID information Y is again urged.

If the result of the determination in step #211 is affirmative, i.e., if the ID information Y does not coincide with the ID information X even after urging input of ID information Y the predetermined number of times ($N_1$), it can be considered that a user who does not know the ID information is using the camera 3. Hence, the process proceeds to step #213, where the counted number of comparison operatins N is reset. Then, in step #214, registration for performing processing of rewriting the film-ID information X into ID information Z which cannot be input through the key-input switch unit 30 of the camera 3 is performed. The registration is for performing this processing while the film 2 is rewound because ID information cannot be recorded on the magnetic layer when the film 2 stops. Then, in step #215, the fact that ID information cannot be again input, and this film 2 cannot be used even if the film 2 is again loaded and it is intended to obtain permission of the use of the film 2 according to input and comparison of ID information Y is warned to the user using warning means, such as the warning sound generator 24 or the like, (display, vibration or the like may also be used), and the process proceeds to step #504 shown in FIG. 10.

If the result of the determination in step #209 is affirmative, the process prceeds to step #216, where the counted number of comparison operations N is reset. Then, in step #217, a display on the liquid-crystal display unit 20 asks the user whether or not the ID system of the first embodiment is to be used. If the ID system is to be used, the process proceeds to step #301 shown in FIG. 8. In step #301, it is determined if ID information X is present. If the result of the determination in step #301 is affirmative, the process proceeds to step #302, where specific stored information, such as the date of the final photographing operation, the number of remaining photographable frames, and the like, correlated with the ID information X stored in the nonvolatile storage unit 21a within the camera 3 is retrieved. Then, in step #303, it is determined if specific stored information is present. If the result of the determination in step #303 is affirmative, the process proceeds to step #304, where the ID information X and the specific stored information are displayed on the liquid-crystal display unit 20 in order to clarify the contents of the catridge 1. On the other hand, if the result of the determination in step #303 is negative, as in a case in which the cartridge 1 is mounted in a camera having a different ID system, the process proceeds to step #305, where only the ID information X is displayed. In any case, after step #304 or #305, the process proceeds to steps starting from step #306 in order to accept an ID mode and change settings relating to the ID information if necessary.

In step #306, it is determined if an ID input mode is set by the user. If the result of the determination in step #306 is affirmative, the process proceeds to step #307, where input (recording) of the ID information X is registered in order to record the current ID information X while rewinding the film 2. The process then proceeds to step #313, where it is determined if the ID mode has been terminated. If the result of the determination in step #313 is affirmative, the process proceeds to step #401 shown in FIG. 9. If a mode of changing the ID information to another ID information is set, the process proceeds as step #306→#308→#309. In step #309, the control device 21 performs registration for performing processing of reserving desired ID information and changing (rewriting) the ID information X. Then, in step #310, if specific stored information stored in the nonvolatile storage unit 21a of the camera 3 in a state of being correlated with the ID information X is present, the specific stored information is rewritten so as to be correlated with the desired ID information. The process then proceeds to step #401 shown in FIG. 9 through step #313. If a mode of erasing the ID information X is set, the process proceeds as step #306→#308→#311. In step #311, the control device 21 performs registration for performing processing of erasing the ID information X. Then, in step #312, if there is specific stored information stored in the nonvolatile storage unit 21a of the camera 3 in a state of being correlated with the ID information X, the specific stored information is erased. The process then proceeds to step #401 shown in FIG. 9 via step #313.

The above-described setting of the ID changing mode or the like is performed using the mode changing switch 25, and display of the set mode is performed on the liquid-crystal display unit 20 of the camera 3. The method for setting the ID mode in the first embodiment described above is only an example, and the ID mode may be set according to any other appropriate method without causing any problem.

If the result of the determination in step #204 shown in FIG. 7 is negative, i.e., when the film does not have ID information or does not use an ID system, the process proceeds to step #217 in order to permit the use of the cartridge. If the result of the determination in step #205 is negative, i.e., when the ID information coincides with ID information indicating prohibition of the use of the film (or the ID information Z rewritten in step #214 shown in FIG. 7), the process proceeds to step #215, where warning that the use of the film is prohibited is performed. If the result of the determination in step #217 is negative, the process proceeds to step #401 shown in FIG. 9. If the result of the determination in step #217 shown in FIG. 7 is affirmative, but the result of the determination in step #301 shown in FIG. 8 is negative, the process proceeds to step #306, where it is determined if the mode is the ID input mode.

Figure 9:
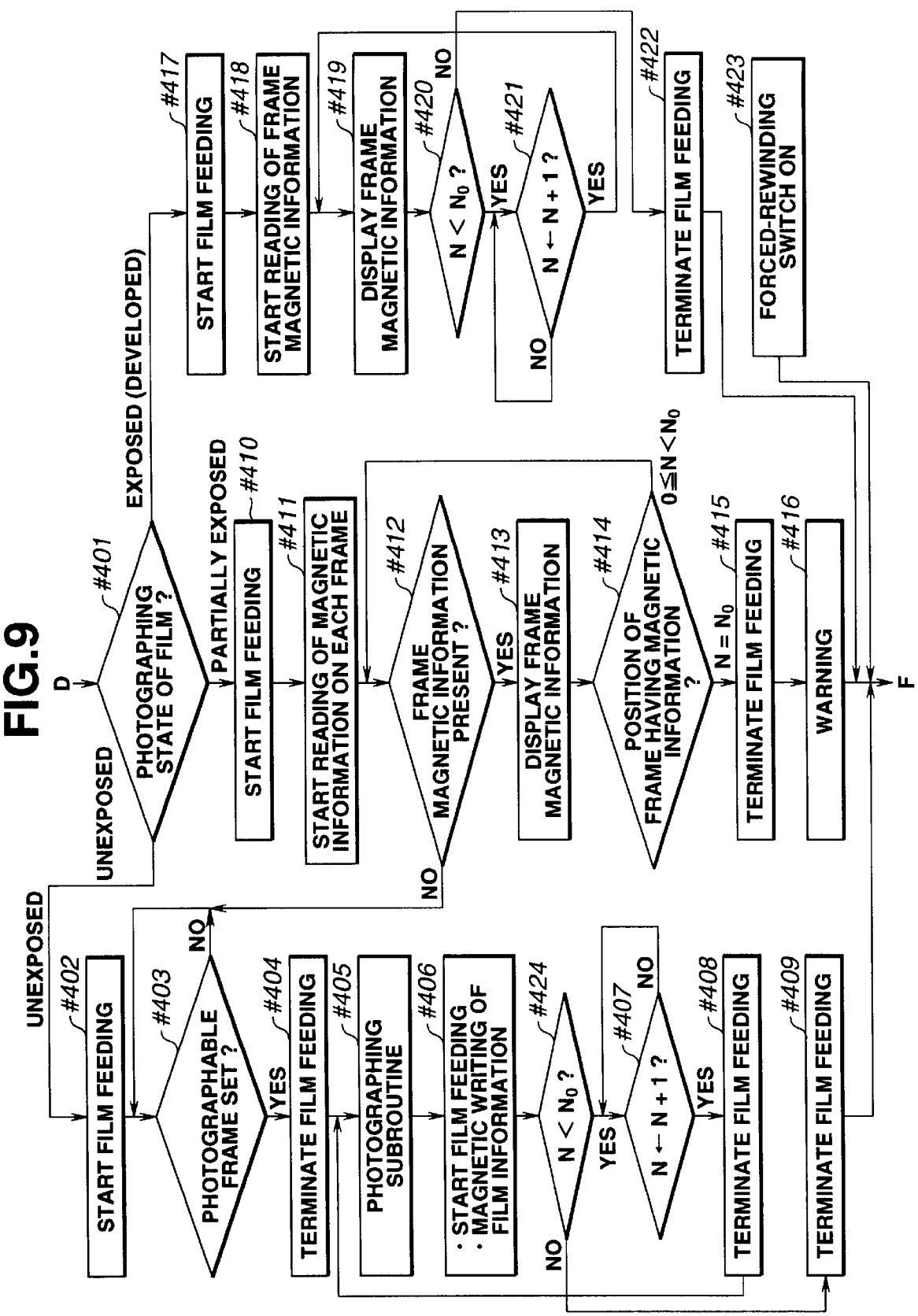

Next, a description will be provided of the operation starting from step #401 shown in FIG. 9.

The photographing state of the loaded film 2 obtained from the cartridge information on the flange portion 1b of the cartridge 1 using the cartridge-information reading sensor 15 while the film 2 is being fed is stored in the nonvolatile storage unit 21a of the camera 3 (the stage of step #202 shown in FIG. 7). In step #401 shown in FIG. 9, the photographing state of the film 2 is determined. When the film 2 has been determined to be an unexposed film, the process proceeds to step #402, where the film 2 is wound around the spool 28 by driving the film feeding motor 29. Then, in step #403, it is awaited until it can be determined that the film 2 has been fed to a photographable position according to the output of the film-position detection sensor 23. If the result of determination in step #403 is affirmative, the process proceeds to step #404, where film feeding is stopped by stopping the driving of the motor 29.

Then, in step #405, a photographing subroutine for exposing the film 2 is started. In this subroutine, a series of photographing operations including distance measurement, focus adjustment, diaphragm driving and shutter driving is performed as a result of a releasing operation using the photographing unit 31 shown in FIGS. 4 and 5. Since these operations are the same as ordinary photographing operations, further description thereof will be omitted. Upon completion of these photographing operations, the process proceeds to step #406, where winding of the photographing frame is started, and writing of film information (photographing-frame information), such as the date of the photographing operation, exposure information and the like, is performed on the photographing frame being fed, using the magnetic head 26. Then, in step #424, it is determined if the count number of the frame currently being fed N is smaller than the number of photographable frames $N_0$. If the result of the determination in step S424 is affirmative, i.e, when photographable frames still remain, the process proceeds to step #407, where the count number of frames is incremented by one by confirming that the photographing frame is fed to the next frame by the film-position detection sensor 23. Then, in step #408, film feeding is terminated, and the process returns to step #405, where a photographing operation for the next frame is awaited.

Figure 10:
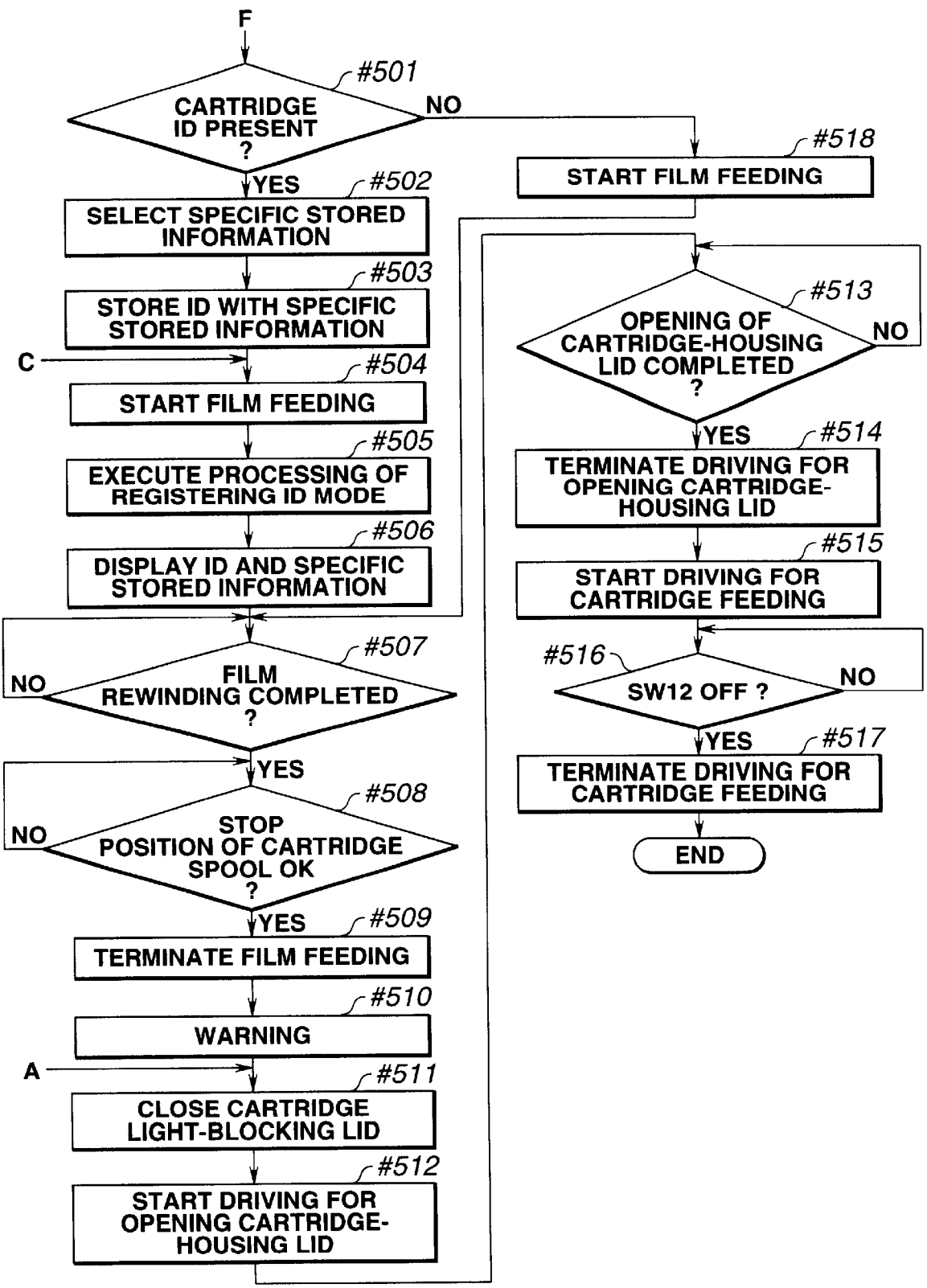
Figure 12A:
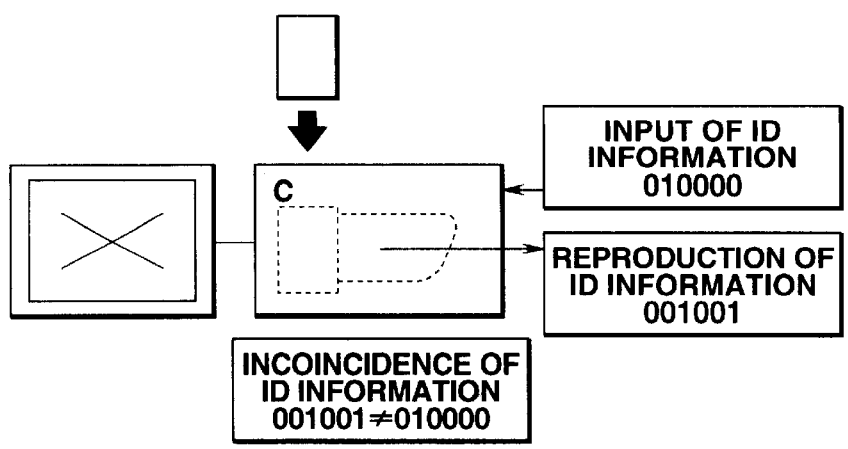
Figure 12B:
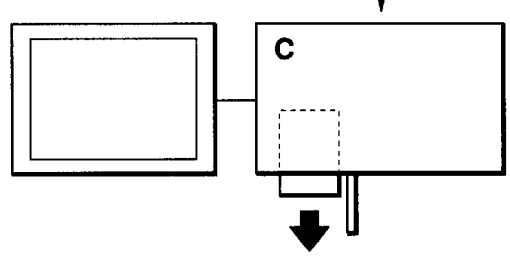
Figure 12C:
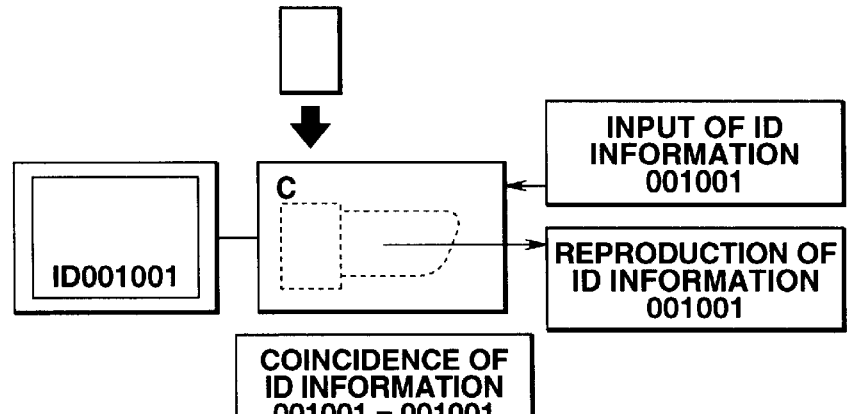
Figure 12D:
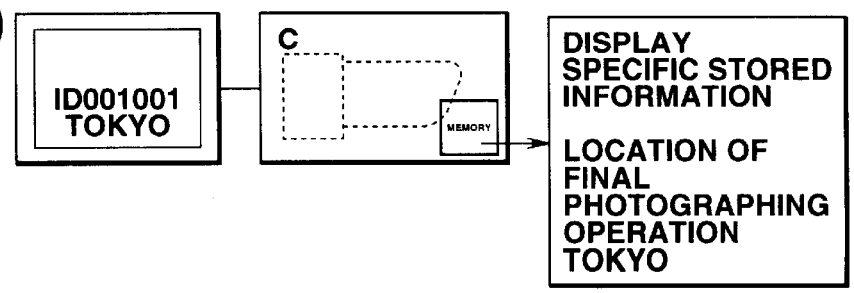
Figure 13A:
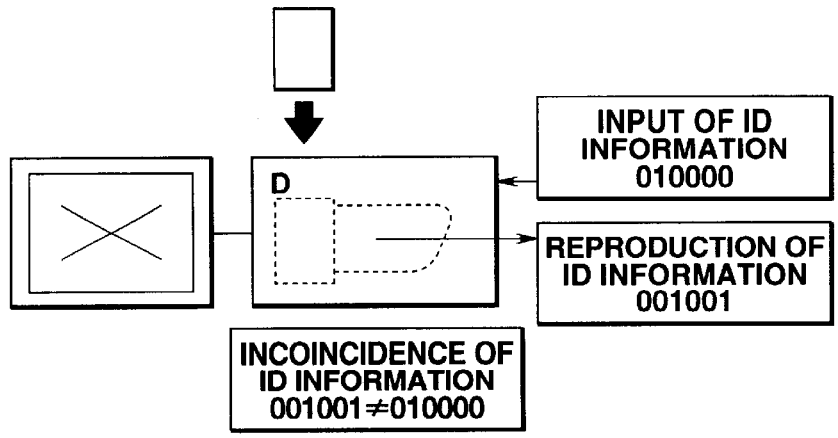
Figure 13B:
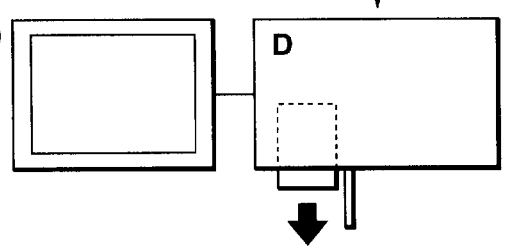
Figure 13C:
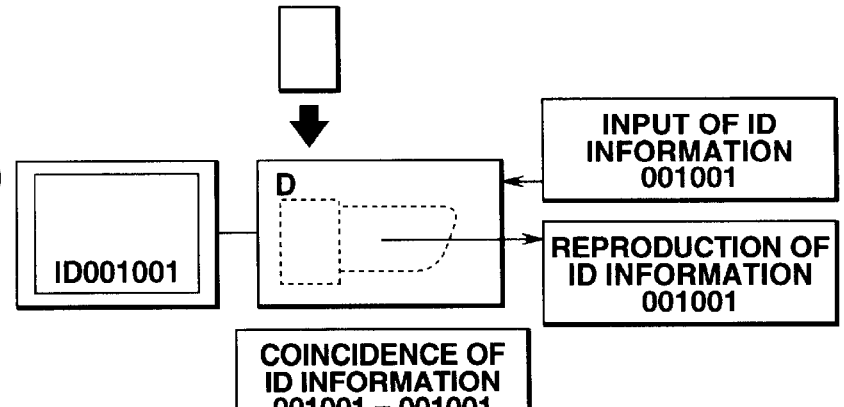
Figure 13D:
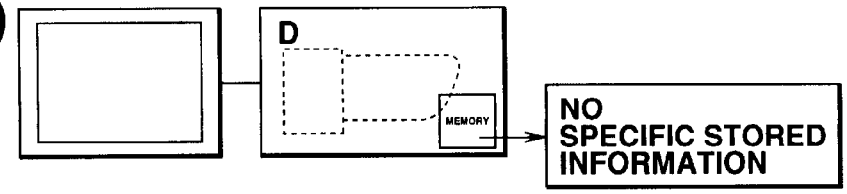

If the result of the determination in step #424 is negative, i.e., the count number of fed frames N reaches the number of photographable frames $N_0$, the process proceeds to step #409, where the winding of the film 2 by the film feeding motor 29 is stopped, and the process proceeds to step #501 for confirming the presence of ID information shown in FIG. 10. When the forced rewinding switch 27 has been switched on, for example, due to waiting for a photographing operation (step #423), the process also proceeds to step #501 shown in FIG. 10.

In step #501 shown in FIG. 10, it is determined if film-ID information is present at a predetermined portion. If the result of the determination in step #501 is affirmative, the process proceeds to step #502, where specific stored information (the date of the final photographing operation in the case of FIG. 2) obtained from the information detection unit 22 is selected. Then, in step #503, the ID information input by the user and the specific stored information related to the ID information are stored in the nonvolatile storage unit 21. Then, in step #504, rewinding of the film 2 is started by driving the film feeding motor 29. Then, in step #505, commands relating to the ID information registered at a leader portion provided in the film 2 in steps #214, #307, #309 and #311 shown in FIGS. 7 and 8 are executed. Then, in step #506, the stored ID information and specific stored information are displayed on the liquid-crystal display unit 20. Then, in step #507, the completion of rewinding of the film 2 is awaited.

Upon the completion of rewinding of the film 2, then, in steps #508 and #509, the flange portion 1b of the cartridge 1 is stopped at a desired position using the cartridge-information reading sensor 15, in order to be able to know the photographing state of the cartridge 1 (unused, being used, used, or develped). Then, in step #510, a warning sound is generated or a warning display is performed by the warning sound generator 24 or the liquid-crystal display unit 20, respectively, in order to notify the user that the cartridge 1 is in a state of being able to be fed. Then, in step #511, the cartridge light-blocking lid is closed by driving the motor 19. Then, in step #512, driving to open the cartridge-housing lid 5 is started. Then, in step #513, it is determined if the cartridge-housing lid 5 has been completely opened (if the cartridge-housing-lid opening detection switch 6 has been switched on). If the result of the determination in step #513 is affirmative, the process proceeds to step #514, where driving to open the cartridge-housing lid is terminated. Then, in step #515, the motor 13 for feeding the cartridge 1 is driven. Then, in step #516, it is determined if the outside of the cartridge 1 does not depress the cartridge feeding detection switch 12 (abbreviated as SW12 in the flowchart), i.e., the SW12 is switched off. If the result of the determination in step #516 is affirmative, the process proceeds to step #517, where driving to feed the cartridge 1 is terminated by stopping the driving of the motor 13.

If the result of the determination in step #501 is negative, the process proceeds to step #518, where rewinding of the cartridge 1 is started by driving the film feeding motor 29. Then, the process proceeds to the above-described operation starting from step #507.

If it has been determined in step #401 that the film is partially exposed, the process proceeds to step #410, where driving to rewind the film 2 is started by driving the feeding motor 19. Then, in step #411, magnetic recording information for each frame recorded on the magnetic layer on the film 2 is read using the magnetic head 26. Then, in step #412, it is determined if magnetic information is present in a photographable frame. If the result of the determination in step #412 is affirmative, the process proceeds to step #413, where the frame magnetic information is reproduced and notified to the user using the liquid-crystal display unit 20, the warning sound generator 23 or the like. Then, in step #414, the number of exposed frames to the frame having the magnetic information is checked. If the number of the exposed frames N is less than the number of photographable frames $N_0$, the process returns to step #412 while sequentially continuing reading. If the result of the determination in step #412 is negative, i.e., when magnetic information is absent in photographable frames, indicating that the concerned frame is the leading frame of unexposed frames, the process proceeds to step #403. On the other hand, when magnetic information is present for all photographable frames, that indicates that there is no unexposed frame. Hence, the process proceeds from step #414 to step #415, and then to step #416, where waring is provided using the warning sound generator 24 so as to indicate incapability of further photographing operation. The process then proceeds to the operation starting from step #501 shown in FIG. 10.

When it has been determined in step #401 shown in FIG. 9 that the film 2 is exposed (developed), the process proceeds to step #417, where winding of the film 2 is started by driving the feeding motor 19. Then, in step #418, magnetic recording information for each frame recorded in the leader portion of the film 2 is read by the magnetic head 26. Then, in step #419, if frame magnetic information is present at a predetermined position and can be reproduced, the frame magnetic information is notified to the user using the liquid-crystal display unit 20 or the warning sound generator 24. Then, in step #420, it is determined if the count number of the frame currently being fed N is less than the number of photographable frames $N_0$. If the result of the determination in step #420 is affirmative, i.e., when the film 2 is not completely fed, the process proceeds to step #421, where it is determined if the count number is incremented by one. The count number is incremented as soon as the film-position detection sensor 23 can confirm that the photographing frame is fed to the next frame. If the result of the determination in step #421 is affirmative, the process returns to step #419, and film feeding is continued while reproducing magnetic information for each frame. If the result of the determination in step #420 is negative, i.e., when it has been determined that all photographable frames have been fed, the process proceeds to step #422, where the winding of the film 2 by the film feeding motor 29 is stopped. Then, the process proceeds to the operation starting from step #501 shown in FIG. 10.

Although in the foregoing description, the cartridge 1 is fed immediately after the film 2 has been rewound (steps #511–#517), the process may be terminated at the warning in step #510, and the cartridge 1 may be taken out by switching on the cartridge-housing-lid opening switch 4. That is, the flow of step #101→#102→#103 shown in FIG. 6 →step #511→#512, . . . shown in FIG. 10 may be adopted.

According to the above-described first embodiment, the following effects will be obtained.

It is possible to use magnetic information recorded on a film as ID information, without using a bar code representing an ID number on an exposed film which has been exposed during production and appears by being developed, or bar code display or numerical notation indicating an ID number marked on the outside of a cartridge. That is, only the person which has first recorded such ID information on the film can know the ID information, so that the ID information has the function of a personal identification number for using the cartridge. Since a magnetic head provided in a camera accommodating the cartridge is used as a unit for reproducing the ID information, it is possible to prevent an increase in the size and the cost of the camera.

It is also possible to change subsequent processing by comparing the ID information with input ID information.

More specifically, when the reproduced ID information coincides with the input ID information, an ordinary photographing operation can be performed. On the other hand, when the reproduced ID information does not coincide with the input ID information, for example, it is possible to prohibit a photographing operation, or discharge the cartridge in order to protect secrecy of the film, or prohibit the use of the cartridge having unknown contents by other people.

Since arbitrary ID information can be recorded using the magnetic head provided in the camera, the ID information can have the role of a symbol for classifying the cartridge in addition to the role of a personal identification number. Since the magnetic head provided in the camera is used as a unit for recording the ID information, it is possible to prevent an increase in the size and the cost of the camera.

When there is the possibility of the use of the cartridge by a person who does not know the ID information, input of ID information is stopped if input error occurs a predetermined number of times. Hence, it is possible to prevent a case in which a person who does not the ID information can use the film by performing input of ID information many times. Since the ID information cannot be used if input error occurs a predetermined number of times, this approach is useful in a case in which the user does not want that the film is used by other people.

Since ID information and specific stored information related to the ID information (specific frame information of a film useful for identifying the film, the date of the final photographing operation, the remaining number of photographable frames, and the like) are stored, and this information is displayed when the reproduced ID information coincides with input ID information, it is possible to know the contents of a cartridge more exactly than when displaying only the ID information.

When the reproduced ID information does not coincide with input ID information, the fact is notified using a sound, a display, vibration or the like. Hence, it is possible to provide a camera which is easy to use.

When the reproduced ID information does not coincide with input ID information, the film is rewound into the cartridge. Hence, the use of the cartridge by other people is prevented.

Since ID information can be changed or erased based on the user's own will, the user can easily arrange cartridges based on ID information.

Only when ID information coincides with specific stored information, the ID information and the specific stored information are displayed. Hence, each film can be easily identified.

FIGS. 11–13 are schematic diagrams illustrating the concept when an apparatus having a cartridge-ID confirming function is applied to a film scanner according to a second embodiment of the present invention.

FIG. 11(a) illustrates a state in which a cartridge where ID information is not yet input is loaded in a film scanner C. As shown in FIG. 11(a), a monitor is connected to the film scanner (hereinafter abbreviated as the "scanner") C via an information output terminal. The monitor may, of course, be integrated with the scanner C.

FIG. 11(b) illustrates a state in which the user of the scanner C inputs arbitrary film-ID information (represented by 001001) in the scanner C, and registers the ID information in a nonvolatile storage unit provided within the scanner C in order to write the ID information in the loaded cartridge. FIG. 11(c) illustrates a state in which image information and magnetic recording information present on the film are received into the scanner C and are output to the monitor. FIG. 11(d) illustrates a state in which the film is rewound after receiving film information. Predetermined information to be particularly stored from among the film information (TOKYO, serving as information relating to the location of the final photographing operation in the case of FIG. 11(d)) is stored in a nonvolatile storage unit provided in the scanner C, and ID information set and registered by the user (represented by 001001) is recorded on a predetermined position of a magnetic recording portion provided on the film.

ID information is determined by the user's free will. ID information may differ at every photographing operation, or the same ID information determined by the user may be registered at every photographing operation. In the latter case, however, it is recommended not to store specific stored information correlated with the ID information, because the specific stored information cannot be correctly utilized in such a case. The location of the final photographing operation is read from among various types of magnetic information recorded on the film by the scanner C as specific stored information, and is stored in the nonvolatile storage unit in a state of being related to registered ID information when the film is rewound.

FIG. 11(e) illustrates a state in which the cartridge in which ID information is recorded on the film is discharged from the scanner C.

FIG. 12 illustrates a state in which the cartridge, where the ID information has been recorded and that has been discharged as shown in FIG. 11(e), is again loaded in the scanner C.

FIG. 12(1)(a) illustrates a state in which after loading the cartridge, the film-ID information (represented by 001001) is read and compared with ID input information set by the user (represented by 010000). In this case, the read ID information does not coincide with the ID input information for the scanner C (represented by 0010001=010000). Hence, in FIG. 12(1)(b), the loaded cartridge is ejected so as not to be used.

FIG. 12(2)(c) illustrates a state in which after loading the cartridge, the film-ID information (represented by 001001) is read and compared with ID input information set by the user (represented by 001001). In this case, the read ID information coincides with the ID input information for the scanner C (represented by 001001=001001). Hence, in FIG. 12(2)(d), the specific stored information related to the ID information stored in the nonvolatile storage unit of the scanner C is read out and displayed on a display unit provided in the scanner C, or the monitor (ID001001 TOKYO).

FIG. 13 is a diagram illustrating a state in which the cartridge, where the ID information has been recorded and that has been discharged in FIG. 1(d), is again loaded in a scanner D which uses another ID system.

FIG. 13(1)(a) illustrates a state in which after loading the cartridge, the film-ID information (represented by 001001) is read and compared with ID input information set by the user (represented by 010000). In this case, the read ID information does not coincide with the ID input information for the scanner D (represented by 001001≠010000). Hence, in FIG. 13(1)(b), the loaded cartridge is ejected so as not to be used.

FIG. 13(2)(c) illustrates a state in which after loading the cartridge, the film-ID information (represented by 001001)

is read and compared with ID input information set by the user (represented by 001001). In this case, the read ID information coincides with the ID input information for the scanner D (represented by 001001=001001). Hence, in FIG. 13(2)(d), it is intended to detect specific stored information related to the ID information stored in the nonvolatile storage unit of the scanner D. Since specific stored information is not stored in the scanner D, display of specific stored information is not performed, although the cartridge can be used.

Figure 14:
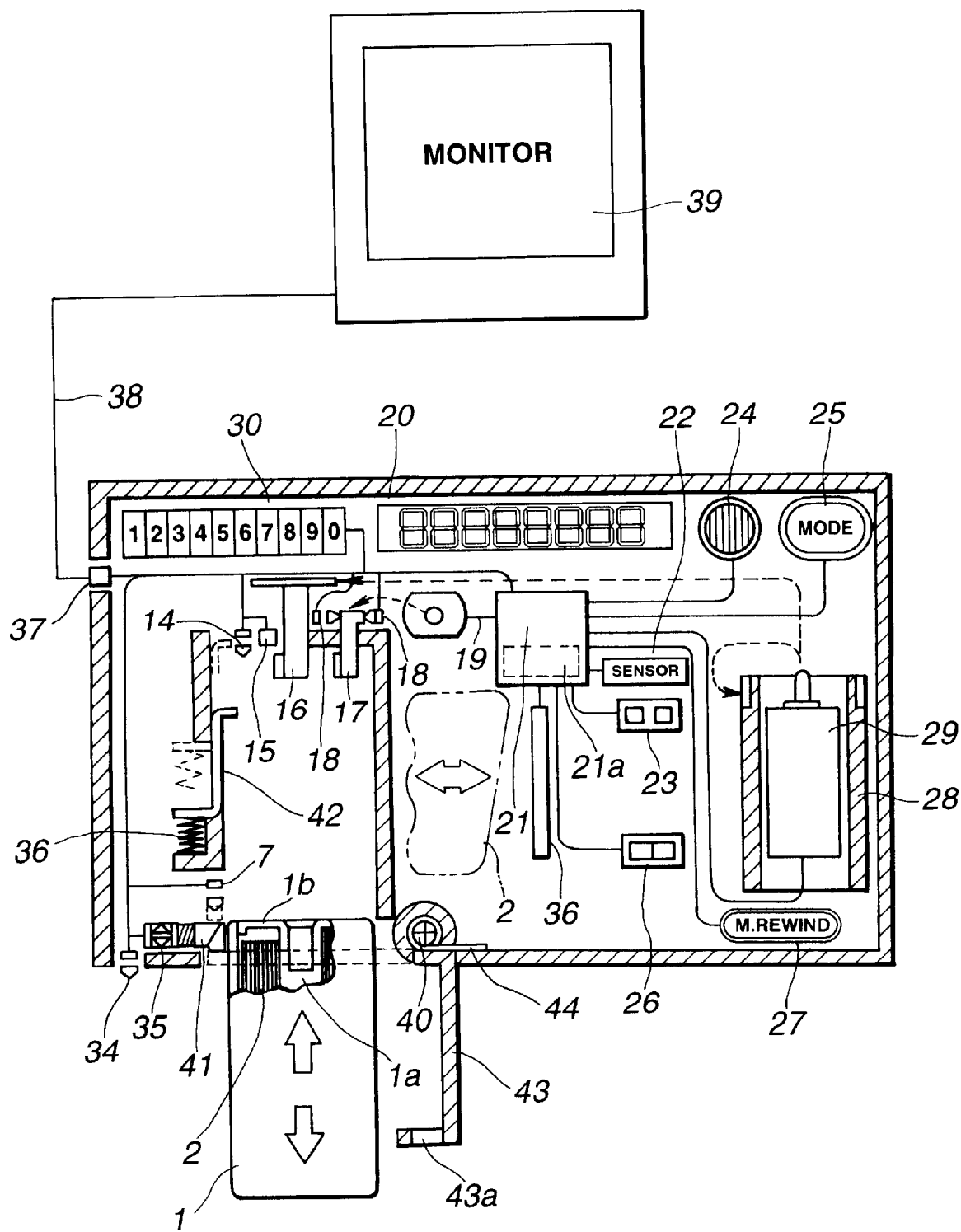
FIG. 14 is a schematic cross-sectional view illustrating the configuration of the scanner according to the second embodiment.

FIG. 14 is a schematic cross-sectional view illustrating the configuration of a scanner in which the concept shown in FIGS. 11–13 is realized. In FIG. 14, the same components as those shown in FIG. 4 are indicated by the same reference numerals, and further description thereof will be omitted.

In FIG. 14, a cartridge-housing lid 43 is rotated around a hinge shaft 40. A torsion spring 44 is attached to the cartridge-housing lid 43 so as to urge the cartridge-housing lid 43 to an opened position. When the cartridge-housing lid 43 is closed, an engaging unit 43a pushes a cartridge-housing-lid locking unit 41 provided on a plunger 35 to engage the locking unit 41 with the engaging portion 43a. Thus, the cartridge-housing lid 43 is fixed in a closed state. In this closed state, the distal end of the cartridge-housing lid 43 depresses a cartridge-housing-lid closing completion detection switch 7, to transmit depression information to a control device 21. A cartridge 1 is loaded in the cartridge housing by contacting the end surface of the cartridge 1 to a cartridge ejector 42 while charging a spring 36 attached to the cartridge ejector 42.

The power from a film feeding motor 29 is transmitted to a fork gear 16 engaged with a cartridge shaft 1a via a gear train (not shown) in order to feed a film 2 to the scanner. The film 2 fed from the cartridge 1 passes through the inside of the scanner, and is wound around a spool 28 driven by the film feeding motor 29. A line-sensor scanner 36 serves as an image-information detection unit for receiving film-image information. The image information is output from an information output terminal 37 via the control unit 21 together with magnetic reproduced information from a magnetic head 26, and is reproduced on a monitor 39 via a cable 38 as an image or sound.

When opening the cartridge-housing lid 43, a cartridge-housing-lid opening switch 34 is depressed. When the cartridge 1 is loaded, the cartridge-housing-lid locking unit 41 is released by driving the plunger 35 after performing closing driving of a driver 17 for driving a cartridge light-blocking lid. The cartridge-housing lid released from locking is opened by the function of the torsion spring 44. At the same time, the ejector 42 operates so as to feed the cartridge 1 by the function of the charged spring 36, so that the cartridge 1 is fed to the outside of the scanner.

Figure 15:
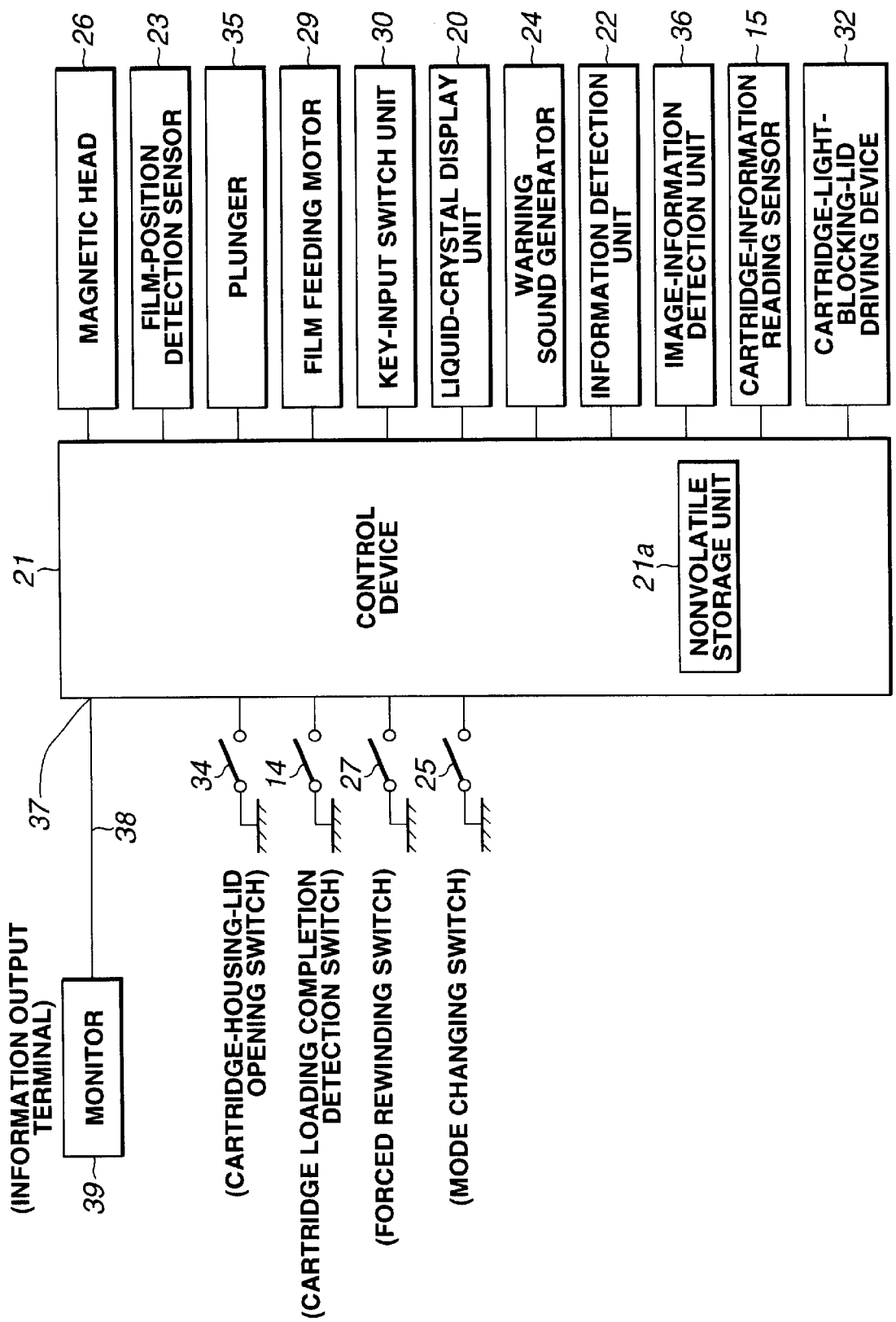
FIG. 15 is a block diagram illustrating the electric configuration of the film scanner according to the second embodiment.

FIG. 15 is a block diagram illustrating the electric configuration of the scanner according to the second embodiment. In FIG. 15, the same components as those shown in FIGS. 4 and 5 are indicated by the same reference numerals. All switches and units are connected to the control device 21, serving as control means.

Figure 16:
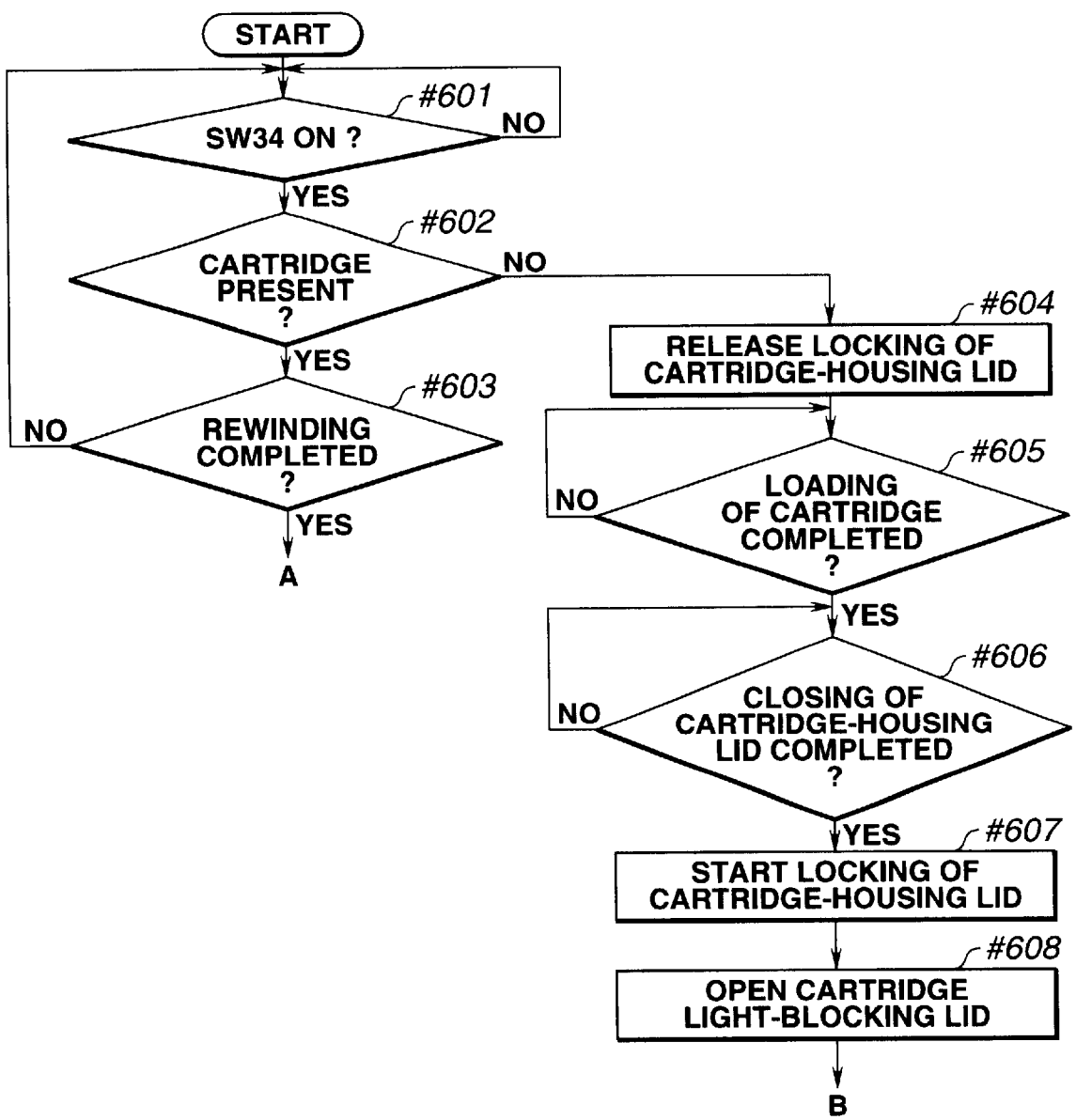

FIGS. 16 through 18 are flowcharts illustrating the operation of the control device 21 of the scanner according to the second embodiment. The flowcharts shown in FIGS. 7 and 8 are also used in the second embodiment by replacing the camera by the scanner.

In FIG. 16, in step #601, it is determined if a cartridge-housing-lid opening switch 34 is switched on by the user in order to load the cartridge 1 within the scanner. If the result of the determination in step #601 is affirmative, the process proceeds to step #602, where it is determined if the cartridge 1 is present within the scanner. If the result of the determination in step #602 is negative, the process proceeds to step #604, where the control device 21 opens the cartridge-housing lid 43 by driving the plunger 35 constituting a cartridge-housing-lid locking device.

Then, in step #605, it is determined if the catridge 1 is loaded within the cartridge housing by the user, and a catridge loading completion detection switch 14 is switched on by being depressed by the end surface of the loaded cartridge 1. If the result of the determination in step #605 is affirmative, the process proceeds to step #606, where it is determined if the cartridge-housing lid 43 is closed by the user, the cartridge-housing-lid locking unit 41 is thereby engaged with a cartridge-housing-lid engaging unit 43a, and the catrridge-housing lid 43 thereby switches on the cartridge-housing-lid closing completion detection switch 7, i.e., if the cartridge 1 is completely closed. If the result of the determination in step #606 is affirmative, the process proceeds to step #607, where a state in which the plunger 35 is not operated even if the cartridge-housing-lid opening switch 34 is depressed and therefore the cartridge-housing lid 43 cannot be opened (a locked state) is provided. Then, in step #608, in order to read a flange portion 1b, where a bar code indicating cartridge information is provided, by a cartridge-information reading sensor 15, a light-blocking lid provided at the film entrance of the cartridge 1 is opened by the rotation of the driver 17 by driving a motor 19. Then, the process proceeds to step #201 shown in FIG. 7 in the first embodiment. Since the processing from step #201 to step #217 shown in FIG. 7 is the same as in the first embodiment, further description thereof will be omitted.

On the other hand, if the result of the determination in step #602 is affirmative, the process proceeds to step #603, where it is determined if the film is rewound. If the result of the determination in step #603 is negative, the process returns to step #601. If the result of the determination in step #603 is affirmative, the process proceeds to step #811 shown in FIG. 18.

In the second embodiment, if the result of the determination in step #217 shown in FIG. 7 is negative, or if the result of the determination in step #313 shown in FIG. 8 is affirmative, the process proceeds to step #701 shown in FIG. 17, and the process proceeds from step #215 shown in FIG. 7 to step #804 shown in FIG. 18.

The photographing state of the loaded film obtained from catridge information on the flange portion 1b of the cartridge 1 using the cartridge-information reading sensor 15 while the film is fed in step #201 shown in FIG. 7 is stored in a nonvolatile storage unit 21a of the scanner. When it has been determined in step #217 shown in FIG. 7 that an ID system is not used, the process proceeds to step #701 shown in FIG. 17 as described above, where the photographing state of the film is determined. When the film is partially exposed, the process proceeds to step #702, where winding of the film is started by driving the film feeding motor 29. Then, the process proceeds to step #703, where magnetic recording information for each frame recorded on the film magnetic layer is read using the magnetic head 26.

Then, in step #704, it is determined if frame magnetic information or image information is present at a predetermined position and can be reproduced. If the result of the determination in step #704 is affirmative, the process proceeds to step #705, where frame magnetic information or image information is output from the output terminal 37 of the control device 21 to the monitor 39 via the cable 38, in order to notify the user of the information by displaying it. Then, in step #706, the frame position of the frame magnetic information or the image information indicating the number of exposed frames is determined. When the number of exposed frames N is less than the number of photographable frames $N_0$, the process returns to step #704 in order to sequentially continue reading. When it has been determined in step #704 that magnetic information is absent on a photographable frame, i.e., the concerned frame is the leading frame which is not exposed, the process proceeds to step #716. When magnetic information or image information is present for each of photographable frames, the process proceeds from step #706 to step #707, and then to step #708, where film winding is stopped and a warning that a setting is wrong is generated using a warning sound generator 24. Then, the process proceeds to step #709, where it is determined whether or not a mode of rewriting frame magnetic information is to be received.

When the film is being fed and magnetic information or image information cannot be reproduced from some frames in step #704, the process proceeds to step #709 for determining if the mode of rewriting frame magnetic information is to be received.

If the result of the determination in step #709 is affirmative, the process proceeds to step #717, where the number of the frame A to be rewritten is input (read) using a key-input switch unit 30 in order to change various types of magnetic information recorded in the frame in accordance with the user's will. Then, in step #718, it is determined if the input frame A is exposed. If the result of the determination in step #718 is affirmative, the process proceeds to step #719, where information relating to the frame A stored in the nonvolatile storage unit 21a of the scanner is output to the monitor 39. Then, in step #720, an operation of rewriting magnetic information relating to the frame A is registered. Then, the process returns to step #709.

If the result of the determination in step #718 is negative, the process returns to step #709.

When a mode of terminating rewriting of frame magnetic information is set in step #709, the process proceeds to step #710, where the rewriting mode is terminated. Then, the process proceeds to step #801 shown in FIG. 18, where presence of ID information is confirmed.

When a forced rewinding switch 27 has been depressed while awaiting rewriting of frame magnetic information (step #721), the process also proceeds to step #801 shown in FIG. 18.

In step #801 shown in FIG. 18, it is determined if film-ID information is reproduced at a predetermined position. If the result of the determination in step #801 is affirmative, the process proceeds to step #802, where specific stored information set in advance in the scanner (the location of the final photographing operation in the case of FIG. 11) is selected by the magnetic head 26 when reproducing magnetic information. Then, in step #803, the specific stored information is stored in the nonvolatile storage unit 21a in a state of being related to ID information which has been input by the user, in addition to the ID information.

Then, in step #804, film rewinding is started by driving the film feeding motor 29. Then, in step #805, a command to record ID information registered in step #214 shown in FIG. 7 and in steps #307, #309 and #311 shown in FIG. 8 at a predetermined magnetic recording position on the film being fed is executed. Then, in step #806, the stored ID information and specific stored information are displayed on a liquid-crystal display unit 20 or the monitor 39. Then, in step #807, it is determined if film rewinding is completed. If the result of the determination in step #807 is affirmative, the process proceeds to step #808, and then to step #809, where the flange 1b of the cartridge 1 is stopped at a desired position using the cartridge-information reading sensor 15, so that the photographing state of the cartridge (unused, being used, used, or developed) can be known.

Then, in step #810, in order to notify the user that the cartridge 1 can be fed, a warning sound is generated or a warning display is performed using the warning sound generator 24, or the liquid-crystal display unit 20 or the monitor 39, respectively. Then, in step #811, the cartridge light-blocking lid is closed by driving the motor 19. Then, in step #812, the cartridge 1 is fed to the outside of the scanner by releasing power supply to the plunger 35, serving as a cartridge-lid locking device, and the process is terminated.

If the result of the determination in step #801 is negative, the process proceeds to step #813, where film rewinding is started by driving the film feeding motor 29. The process then proceeds to the above-described processing starting from step #807.

When it has been determined in step #701 shown in FIG. 17 that the film is unexposed, the process directly proceeds to step #801 shown in FIG. 18.

When it has been determined in step #701 shown in FIG. 17 that the film has been exposed (developed), the process proceeds to step #711, where winding of the film is started using the film feeding motor 29. Then, in step #712, magnetic recording information for each frame recorded on the film magnetic layer is read using the magnetic head 26, and image information on the film is also read. Then, in steps #713–#715, if frame magnetic information or image information is present at a predetermined position and can be reproduced, the frame magnetic information or the image information is output to the monitor 39 via the output terminal 37 and the cable 38, and is displayed for the user. This operation is continued until the number of exposed frames N reaches the number of photographable frames $N_0$, and the number N is incremented every time one frame is fed. When it has been determined in step #714 that the number of exposed frames has reached the number of photographable frames $N_0$, the process proceeds to step #716, where film feeding is terminated. Then, the process proceeds to the above-described step #709.

In the above-described second embodiment, the same effects as in the first embodiment applied to a camera can also be obtained. That is, briefly speaking, it is possible to store ID information desired by the user in a film, and to prevent the user's cartridge from being used by other people who do not know the ID information, because the ID information operates as personal identification number.

By using ID information as identification information for classifying a cartridge, it is possible to confirm an item which cannot be identified from the external appearance of the cartridge (for example, whether or not the film can be used), and to change or erase the ID information in accordance with the user's will. As a result, cartridges can be easily arranged according to ID information.

By displaying ID information, frame image information, frame magnetic information and specific recording information only when two types of ID information coincide, each film can be easily identified.

By prohibiting a photographing operation or film feeding for a cartridge having ID information unsuitable for a scanner, it is possible to preserve secrecy of the film, and prohibit the use of a cartridge having unknown contents.

Although in the above-described embodiments, a magnetic layer (magnetic recording portion) of a film is illustrated as an information recording portion, the present invention is not limited to such an approach. In addition, although ID information is recorded on the film, the ID information may also be recorded on the cartridge itself.

The direction of loading or discharge of the cartridge is not limited to the downward direction of the camera or the like as in the above-described embodiments (for example, the direction may be the forward or sideward direction).

The present invention is not limited to the case of the above-described embodiments in which the cartridge is loaded or discharged in the axial direction.

The present invention may also be applied to a cartridge having a form other than the one in the above-described embodiments, or to a cartridge having an image recording medium other than a film, or to any other appropriate cartridge.

The configuration of software and hardware in the above-described embodiments may be appropriately replaced.

In the present invention, the contents or elements of the above-described embodiments may be combined if necessary.

The present invention may be applied to a case in which the entirety or a part of the configuration of claims or embodiments constitutes a single apparatus, or is combined with another apparatus, or is an element constituting an apparatus.

Although the above-described embodiments illustrate a case in which the present invention is applied to a camera or a film scanner, the present invention may also be applied to any other optical apparatus or any other appropriate apparatus.

The individual components shown in schematic or block form in the drawings are all well known in the camera or film scanner arts and their specific construction and operation are not critical to the operation or the best mode for carrying out the invention.

While the present invention has been described with respect to what are presently considered to be the preferred embodiments, it is to be understood that the invention is not limited to the disclosed embodiments. To the contrary, the present invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. An apparatus for use with a film cartridge having an information recording portion for recording ID information identifying the film cartridge, said apparatus comprising:
    a recording device that records, on the information recording portion of a film cartridge loaded in the apparatus, operator designated ID information which identifies the film cartridge;
    a reading device that reads ID information from an information recording portion of a film cartridge loaded in said apparatus;
    an input device that inputs information received from an external information source; and
    an operation control device that determines whether the ID information read by said reading device and the information input by said input device satisfy a predetermined relationship, and selectively performs an operation based on the determination.

2. An apparatus according to claim 1, wherein said apparatus comprises a camera.

3. An apparatus according to claim 1, wherein said apparatus comprises a film scanner.

4. An apparatus according to claim 1, wherein, when said operation control device determines the information input by said input device and the ID information read by said reading device does not satisfy the predetermined relationship, a predetermined number of times, said operation control device does not perform the operation.

5. An apparatus according to claim 1, wherein said operation control device comprises a storage device that stores information related to the ID information, and wherein, when said operation control device determines the ID information read by said reading device and the information input by said input device satisfy the predetermined relationship, the information related to the ID information stored in said storage device is output to an external device.

6. An apparatus according to claim 5, wherein information related to the ID information stored in said storage device corresponds to a date of photographing a final photographing frame.

7. An apparatus according to claim 5, wherein information related to the ID information stored in said storage device corresponds to at least one of a date of a photographing operation, a location of the photographing operation, and a number of remaining photographable frames.

8. An apparatus according to claim 5, wherein said storage device stores ID information corresponding to information related to the ID information together with the information related to the ID information.

9. An apparatus according to claim 5, wherein said operation control device further comprises a display device, and wherein, when said operation control device determines the ID information read by said reading device and the information input by said input device satisfy the predetermined relationship, the display device displays the information related to the ID information stored in said storage device.

10. An apparatus according to claim 1, wherein said operation control device determines whether or not the information input by said input device coincides with the ID information read by said reading device.

11. An apparatus according to claim 1, wherein said operation control device comprises a display device, and wherein said display device performs a display indicating whether or not the ID information read by said reading device and the information input by said input device satisfy the predetermined relationship.

12. An apparatus according to claim 1, wherein, when said operation control device determines the ID information read by said reading device and the information input by said input device do not satisfy the predetermined relationship, said operation control device prohibits a photographing operation.

13. An apparatus according to claim 1, wherein said operation control device comprises an image display device for displaying an image from an exposed film of a film cartridge loaded in said apparatus, and wherein, when said operation control device determines the ID information read by said reading device and the information input by said input device do not satisfy the predetermined relationship, said operation control device controls said image display device so as not to display an image from a film of the film cartridge from which said reading device has read the ID information.

14. An apparatus according to claim 1, wherein said operation control device comprises an image output device for outputting an image from an exposed film of a film cartridge loaded in said apparatus, and wherein, when said operation control device determines the ID information read by said reading device and the information input by said input device do not satisfy the predetermined relationship, said operation control device controls said image output device so as not to output an image from a film of the film cartridge from which said reading device has read the ID information.

15. An apparatus according to claim 1, wherein said operation control device comprises a film-cartridge discharging device that discharges a film cartridge loaded in said apparatus, and wherein, when said operation control device determines the ID information read by said reading device and the information input by said input device do not satisfy the predetermined relationship, said operation control device controls said film-cartridge discharging device so as to discharge a film cartridge loaded in said apparatus.

16. An apparatus according to claim 1, wherein said operation control device comprises a film rewinding device, and wherein, when said operation control device determines the ID information read by said reading device and the information input by said input device do not satisfy the predetermined relationship, said operation control device controls said film rewinding device so as to perform film rewinding.

17. An apparatus according to claim 1, wherein, when the operation control device determines a film cartridge loaded in said apparatus does not have ID information, said operation control device controls said apparatus so as to use the film cartridge.

18. An apparatus according to claim 1, wherein, when said operation control device determines the ID information read by said reading device and the information input by said input device satisfy the predetermined relationship, said operation control device controls said apparatus so as to perform at least one of rewriting and erasing of the ID information.

19. An apparatus according to claim 1, wherein the information recording portion comprises a magnetic recording portion of a film.

20. An apparatus according to claim 1, wherein said operation control device comprises a manual selection device, and when said operation control device determines the ID information read by said reading device and the information input by said input device satisfy the predetermined relationship, said manual selection device is manually operable to select a subsequent operation.

21. An apparatus according to claim 1, wherein said input device comprises a manual input device.

22. A camera for use with a film cartridge having an information recording portion, said camera comprising:

an operating member that inputs operator designated ID information which identifies a film cartridge loaded in the camera;

a recording device that records ID information input by the operating member on the information recording portion of a film cartridge loaded in the camera;

a reading device that reads ID information recorded on the recording portion of a film cartridge loaded in the camera; and a prohibition circuit that prohibits an exposure operation of the film cartridge to expose the film when the ID information input by said operating member and the ID information read by said reading device are different.

* * * * *

UNITED STATES PATENT AND TRADEMARK OFFICE
CERTIFICATE OF CORRECTION

PATENT NO.   : 6,249,649 B1
DATED        : June 19, 2001
INVENTOR(S)  : Ryoji Okuno It is certified that error appears in the above-identified patent and that said Letters Patent is hereby corrected as shown below:

Column 4,
Line 67, "conveynance" should read -- conveyance --.

Column 5,
Line 33, "swithed" should read -- switched --.

Column 6,
Line 59, "operatins" should read -- operations --.

Column 7,
Line 8, "prceeds" should read -- proceeds --.

Column 10,
Line 12, "waring" should read -- warning --.

Column 18,
Line 52, "do" should read -- does --.

Signed and Sealed this

Twenty-sixth Day of February, 2002

Attest:

Attesting Officer

JAMES E. ROGAN
Director of the United States Patent and Trademark Office